(12) United States Patent
Takahashi et al.

(10) Patent No.: US 10,812,872 B2
(45) Date of Patent: Oct. 20, 2020

(54) TRANSMITTING DEVICE, TRANSMITTING METHOD, RECEIVING DEVICE, AND RECEIVING METHOD FOR PROVIDING EMERGENCY ALERT INFORMATION

(71) Applicant: SONY SEMICONDUCTOR SOLUTIONS CORPORATION, Atsugi-shi (JP)

(72) Inventors: Kazuyuki Takahashi, Chiba (JP); Lachlan Bruce Michael, Saitama (JP)

(73) Assignee: SONY SEMICONDUCTOR SOLUTIONS CORPORATION, Atsugi-shi (JP)

( * ) Notice: Subject to any disclaimer, the term of this patent is extended or adjusted under 35 U.S.C. 154(b) by 0 days.

(21) Appl. No.: 16/300,360

(22) PCT Filed: Jun. 16, 2017

(86) PCT No.: PCT/JP2017/022248
§ 371 (c)(1),
(2) Date: Nov. 9, 2018

(87) PCT Pub. No.: WO2018/003541
PCT Pub. Date: Jan. 4, 2018

(65) Prior Publication Data
US 2019/0166409 A1    May 30, 2019

(30) Foreign Application Priority Data
Jun. 30, 2016    (JP) .................................. 2016-129602

(51) Int. Cl.
*H04N 21/81*    (2011.01)
*H04H 20/59*    (2008.01)
(Continued)

(52) U.S. Cl.
CPC ........... *H04N 21/814* (2013.01); *G08B 27/00* (2013.01); *H04H 20/28* (2013.01); *H04H 20/59* (2013.01);
(Continued)

(58) Field of Classification Search
None
See application file for complete search history.

(56) References Cited

U.S. PATENT DOCUMENTS

2008/0120645 A1 * 5/2008 Yun ...................... G08B 27/008
725/33
2011/0141232 A1    6/2011 Tsukagoshi
(Continued)

FOREIGN PATENT DOCUMENTS

JP    2001-275069 A    10/2001
JP    2011-30179 A    2/2011
(Continued)

OTHER PUBLICATIONS

Extended European Search Report dated Jun. 6, 2019 in corresponding European Patent Application No. 17819901.4, citing documents AO and AP therein, 5 pages.
(Continued)

*Primary Examiner* — James R Marandi
(74) *Attorney, Agent, or Firm* — Oblon, McClelland, Maier & Neustadt, L.L.P.

(57) ABSTRACT

The present technology relates to a transmitting device, a transmitting method, a receiving device, and a receiving method, which are capable of improving immediacy and flexibility of an alert.
A transmitting device generates transmission data in which an index associated with predetermined process-related information in a relevant table in which process-related information related to an output process of outputting an
(Continued)

alert on a receiving side is registered in association with an index is included in data of a physical layer, the relevant table being included in data of a higher layer higher than the physical layer and supplied, and transmits the transmission data. The receiving device obtains a relevant table, receives transmission data, and acquires an index included in data of a physical layer from the transmission data. Then, the receiving device executes an output process corresponding to process-related information associated with the index included in the data of the physical layer in the relevant table. For example, the present technology can be applied in a case where an emergency alert is provided in television broadcasting.

12 Claims, 29 Drawing Sheets

(51) Int. Cl.
*H04H 60/13* (2008.01)
*H04H 60/42* (2008.01)
*H04N 21/2362* (2011.01)
*H04N 21/434* (2011.01)
*H04H 20/28* (2008.01)
*G08B 27/00* (2006.01)

(52) U.S. Cl.
CPC ............ *H04H 60/13* (2013.01); *H04H 60/42* (2013.01); *H04N 21/2362* (2013.01); *H04N 21/434* (2013.01); *H04N 21/4345* (2013.01)

(56) References Cited

U.S. PATENT DOCUMENTS

| | | |
|---|---|---|
| 2011/0289542 A1 | 11/2011 | Kitazato et al. |
| 2016/0192034 A1 | 6/2016 | Yamane et al. |
| 2016/0198241 A1 | 7/2016 | Kitazato |
| 2017/0201337 A1 | 7/2017 | Michael et al. |
| 2018/0270634 A1* | 9/2018 | Kim ...................... H04W 48/00 |

FOREIGN PATENT DOCUMENTS

| | | |
|---|---|---|
| JP | 2011-41242 A | 2/2011 |
| JP | 2015-61240 A | 3/2015 |
| JP | 2015-104055 A | 6/2015 |
| WO | WO 2015/040914 A1 | 3/2015 |
| WO | WO 2016/006472 A1 | 1/2016 |

OTHER PUBLICATIONS

International Search Report dated Aug. 1, 2017 in PCT/JP2017/022248, citing documents AO-AS therein, 2 pages.

"Transmission System for Digital Terrestrial Television Broadcasting", ARIB Standard, ARIB STD-B31, Version 2.2-E1, Mar. 18, 2014, 191 pages.

* cited by examiner

FIG. 8

| Syntax | No of Bits | Mnemonic | Semantics |
|---|---|---|---|
| EA_EXIST_FLAG | 1 | bslbf | FLAG INDICATING THAT THERE IS INFORMATION |
| if(EA_EXIST_FLAG) { | | | |
| version | 8 | uimsbf | VERSION OF INFORMATION |
| NUM_EA_MESSAGE | 8 | bslbf | NUMBER OF DISASTER TYPE CODES |
| for(i=0;i<NUM_EA_MESSAGE;i++) { | | | |
| EA_code | 8 | uimsbf | DISASTER TYPE CODE |
| EA_status | 2 | | STATE OF EMERGENCY ALERT |
| location_type | 3 | bslbf | TYPE OF LOCATION CODE |
| location_length | var | bslbf | LENGTH OF LOCATION CODE |
| location_code | var | uimsbf | LOCATION CODE |
| } | | | |
| } | | | |

FIG. 9

| EA_status | STATE OF EMERGENCY ALERT |
|---|---|
| 0 | EMERGENCY ALERT STARTS |
| 1 | CONTINUED |
| 2 | END |
| 3 | FUTURE RESERVATION |

FIG. 10

| location_type | MEANING OF VALUE | NUMBER OF BITS OF location_length | NUMBER OF BITS OF location_code |
|---|---|---|---|
| 0 | NATIONWIDE | – | – |
| 1 | PRESET PREFECTURAL CODE | 0bit (UNNECESSARY SINCE location_code IS ALWAYS 8 BITS) | 8bit |
| 2 | ZIP CODE | 3bit (1 TO 7 DIGITS) | MAXIMUM 7 DIGITS x4bit=28bit (EX: 141-0000) |
| 3 | LATITUDE·LONGITUDE COORDINATES DESIGNATION | 4bit (1 TO 9 DIGITS) | MAXIMUM 9 DIGITS x4bit x2(LATITUDE, LONGITUDE) x2(START POINT, END POINT)=144bit (EX: 035.427293, 139.360740) |
| 4-7 | FUTURE RESERVATION | – | – |

FIG. 11

JAPANESE TO-DO-FU-KEN (PREFECTURE) JIS IDENTIFICATION CODE (JIS X0401)

| | | | | | |
|---|---|---|---|---|---|
| 1 | HOKKAIDO | 17 | ISHIKAWA | 33 | OKAYAMA |
| 2 | AOMORI | 18 | FUKUI | 34 | HIROSHIMA |
| 3 | IWATE | 19 | YAMANASHI | 35 | YAMAGUCHI |
| 4 | MIYAGI | 20 | NAGANO | 36 | TOKUSHIMA |
| 5 | AKITA | 21 | GIFU | 37 | KAGAWA |
| 6 | YAMAGATA | 22 | SHIZUOKA | 38 | EHIME |
| 7 | FUKUSHIMA | 23 | AICHI | 39 | KOCHI |
| 8 | IBARAKI | 24 | MIE | 40 | FUKUOKA |
| 9 | TOCHIGI | 25 | SHIGA | 41 | SAGA |
| 10 | GUNMA | 26 | KYOTO | 42 | NAGASAKI |
| 11 | SAITAMA | 27 | OSAKA | 43 | KUMAMOTO |
| 12 | CHIBA | 28 | HYOGO | 44 | OITA |
| 13 | TOKYO | 29 | NARA | 45 | MIYAZAKI |
| 14 | KANAGAWA | 30 | WAKAYAMA | 46 | KAGOSHIMA |
| 15 | NIIGATA | 31 | TOTTORI | 47 | OKINAWA |
| 16 | TOYAMA | 32 | SHIMANE | | |

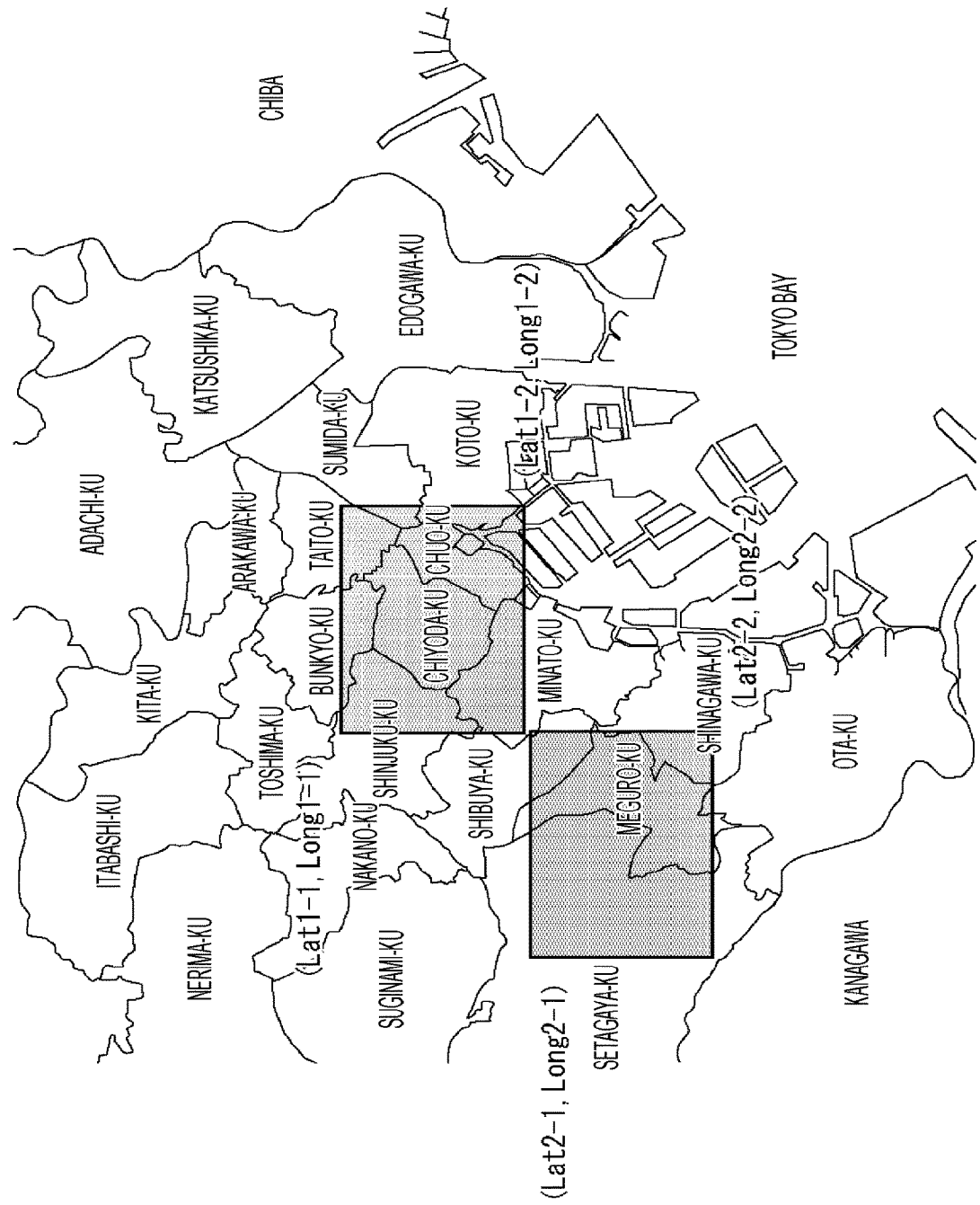

FIG. 14

| Syntax | No of Bits | Mnemonic | Semantics |
|---|---|---|---|
| table_id | 8 | uimsbf | ID OF EMERGENCY ALERT TABLE |
| version | 8 | uimsbf | VERSION OF EMERGENCY ALERT TABLE |
| length | 8 | uimsbf | LENGTH OF EMERGENCY ALERT TABLE |
| NUM_EA_INFO | 8 | bslbf | NUMBER OF DISASTER TYPE INFORMATION |
| for (i=0; i<NUM_EA_INFO; i++) { | | | |
|   EA_code | 8 | uimsbf | DISASTER TYPE CODE |
|   EA_message_length | 16 | uimsbf | LENGTH OF EMERGENCY ALERT INFORMATION |
|   for (j=0; j<EA_message_length; j++) { | | | |
|     EA_message_data | 8 | | EMERGENCY ALERT INFORMATION |
|   } | | | |
| } | | | |

FIG. 15

| EA_code (DISASTER TYPE CODE) | EA_message_data (EMERGENCY ALERT INFORMATION) |
|---|---|
| 0 | EARTHQUAKE OCCURRED. PLEASE PREPARE FOR STRONG SHAKING. |
| 1 | VIOLENT SHAKING COMES AFTER 1 SECOND. |
| 2 | VIOLENT SHAKING COMES AFTER 2 SECONDS. |
| 3 | VIOLENT SHAKING COMES AFTER 3 SECONDS. |
| 4 | VIOLENT SHAKING COMES AFTER 4 SECONDS. |
| 5 | VIOLENT SHAKING COMES AFTER 5 SECONDS. |
| 6 | HEAVY RAIN OF 30mm OR MORE FALLS. |
| 7 | HEAVY RAIN OF 30mm OR MORE FALLS AFTER 10 MINUTES. |
| 8 | HEAVY RAIN OF 30mm OR MORE FALLS AFTER 15 MINUTES. |
| 9 | HEAVY RAIN OF 30mm OR MORE FALLS AFTER 20 MINUTES. |
| ... | |

FIG. 17

| Syntax | No of Bits | Mnemonic | Semantics |
|---|---|---|---|
| EA_EXIST_FLAG | 1 | bslbf | FLAG INDICATING THAT THERE IS EMERGENCY ALERT INFORMATION |
| if (EA_EXIST_FLAG) { | | | |
| version | 8 | uimsbf | VERSION OF EMERGENCY ALERT INFORMATION |
| NUM_EA_MESSAGE | 8 | bslbf | NUMBER OF DISASTER TYPE CODES |
| for (i=0; i<NUM_EA_MESSAGE; i++) { | | | |
| EA_code | 8 | uimsbf | DISASTER TYPE CODE |
| EA_status | 2 | | STATE OF EMERGENCY ALERT |
| } | | | |
| } | | | |

FIG. 18

| Syntax | No of Bits | Mnemonic | Semantics |
|---|---|---|---|
| table_id | 8 | uimsbf | ID OF EMERGENCY ALERT TABLE |
| version | 8 | uimsbf | VERSION OF EMERGENCY ALERT TABLE |
| length | 8 | uimsbf | LENGTH OF EMERGENCY ALERT TABLE |
| NUM_EA_INFO | 8 | bslbf | NUMBER OF DISASTER TYPE INFORMATION |
| for(i=0;i<NUM_EA_INFO;i++) { | | | |
|   EA_code | 8 | uimsbf | DISASTER TYPE CODE |
|   location_type | 8 | bslbf | TYPE OF LOCATION CODE |
|   location_length | var | uimsbf | NUMBER OF EFFECTIVE DIGITS OF LOCATION CODE |
|   location_code | var | uimsbf | LOCATION CODE |
|   EA_message_length | 16 | uimsbf | LENGTH OF EMERGENCY ALERT INFORMATION |
|   for(j=0;j<EA_message_length;j++) { | | | |
|     EA_message_data | 8 | | EMERGENCY ALERT INFORMATION |
|   } | | | |
| } | | | |

FIG. 21

| Syntax | No of Bits | Mnemonic | Semantics |
|---|---|---|---|
| location_exist_flag | 1 | bslbf | FLAG INDICATING THAT LOCATION CODE IS INCLUDED |
| if(location_exist_flag) { | | | |
| location_code | 8 | uimsbf | LOCATION CODE |
| } | | | |

FIG. 22

| Syntax | No of Bits | Mnemonic | Semantics |
|---|---|---|---|
| table_id | 8 | uimsbf | ID OF CHANNEL SELECTION INFORMATION TABLE |
| length | 8 | uimsbf | LENGTH OF CHANNEL SELECTION INFORMATION TABLE |
| NUM_TUNE_INFO | 8 | bslbf | NUMBER OF CHANNEL SELECTION INFORMATION |
| for (i=0; i<NUM_TUNE_INFO; i++) { | | | |
|   location_code | 8 | uimsbf | LOCATION CODE |
|   channel | 6 | uimsbf | FREQUENCY OF CHANNEL (CHANNEL NUMBER) |
|   protocol | 3 | uimsbf | PROTOCOL |
|   packet_type | 3 | uimsbf | PACKET TYPE OF DATA |
|   layer_fft_size | 2 | uimsbf | FFT SIZE |
|   layer_mod | 3 | uimsbf | MODULATION SCHEME |
|   layer_cod | 3 | uimsbf | CODE RATE OF FEC |
|   layer_gi | 3 | uimsbf | GUARD INTERVAL LENGTH |
|   message_length | 8 | uimsbf | LENGTH OF Message (NETWORK NAME OR THE LIKE) |
|   for (j=0; j<message_length; j++) { | | | |
|     message_data | 8 | bslbf | Message DATA |
|   } | | | |
| } | | | |

FIG. 23

| CHANNEL NUMBER | CENTER FREQUENCY MHz |
|---|---|
| 13 | 473 |
| 14 | 479 |
| 15 | 485 |
| 16 | 491 |
| 17 | 497 |
| 18 | 503 |
| 19 | 509 |
| : | |
| 61 | 761 |
| 62 | 767 |

FIG. 24

| protocol | PROTOCOL |
|---|---|
| 0 | ISDB-T |
| 1 | ISDB-T2 |
| 2..7 | Reserved |

FIG. 25

| packet_type | TYPE OF DATA |
|---|---|
| 0 | MPEG2-TS |
| 1 | TLV/MMT |
| 2..7 | Reserved |

FIG. 26

| layer_fft_size | FFT Size |
|---|---|
| 0 | 8K |
| 1 | 16K |
| 2 | 32K |
| 3 | reserved |

FIG. 27

| layer_mod | Modulation |
|---|---|
| 0 | QPSK |
| 1 | 16QAM |
| 2 | 64QAM |
| 3 | 256QAM-NUC |
| 4 | 1024QAM-NUC |
| 5 | 4096QAM-NUC |
| 6..7 | Reserved |

FIG. 28

| layer_cod | Code Rate |
|---|---|
| 0 | 1/2 |
| 1 | 2/3 |
| 2 | 3/4 |
| 3 | 5/6 |
| 4 | 7/8 |
| 5..7 | Reserved |

FIG. 29

| layer_gi | Guard Interval |
|---|---|
| 0 | 1/4 |
| 1 | 1/8 |
| 2 | 1/16 |
| 3 | 1/32 |
| 4..7 | Reserved |

FIG. 30

| location_code | channel | protocol | packet_type | layer_fft_size | layer_mod | layer_cod | layer_gi | message_data |
|---|---|---|---|---|---|---|---|---|
| 0 | 13 | 0 | 0 | 0 | 2 | 2 | 2 | "Channel1" |
| 0 | 14 | 0 | 0 | 0 | 0 | 0 | 1 | "Channel2" |
| 0 | 15 | 1 | 1 | 2 | 3 | 3 | 2 | "Channel3" |
| 0 | 16 | 1 | 1 | 2 | 3 | 4 | 3 | "Channel4" |
| 1 | 20 | 0 | 0 | 0 | 2 | 2 | 2 | "Channel1" |
| 1 | 21 | 0 | 0 | 0 | 0 | 0 | 1 | "Channel2" |
| 1 | 22 | 1 | 1 | 2 | 3 | 3 | 2 | "Channel3" |
| 2 | 13 | 0 | 0 | 0 | 2 | 2 | 2 | "Channel1" |
| 2 | 15 | 1 | 1 | 2 | 3 | 3 | 2 | "Channel3" |
| 3 | 20 | 0 | 0 | 0 | 2 | 2 | 2 | "Channel1" |
| 3 | 21 | 1 | 1 | 2 | 3 | 3 | 2 | "Channel3" |
| 3 | 22 | 1 | 1 | 2 | 3 | 4 | 3 | "Channel4" |

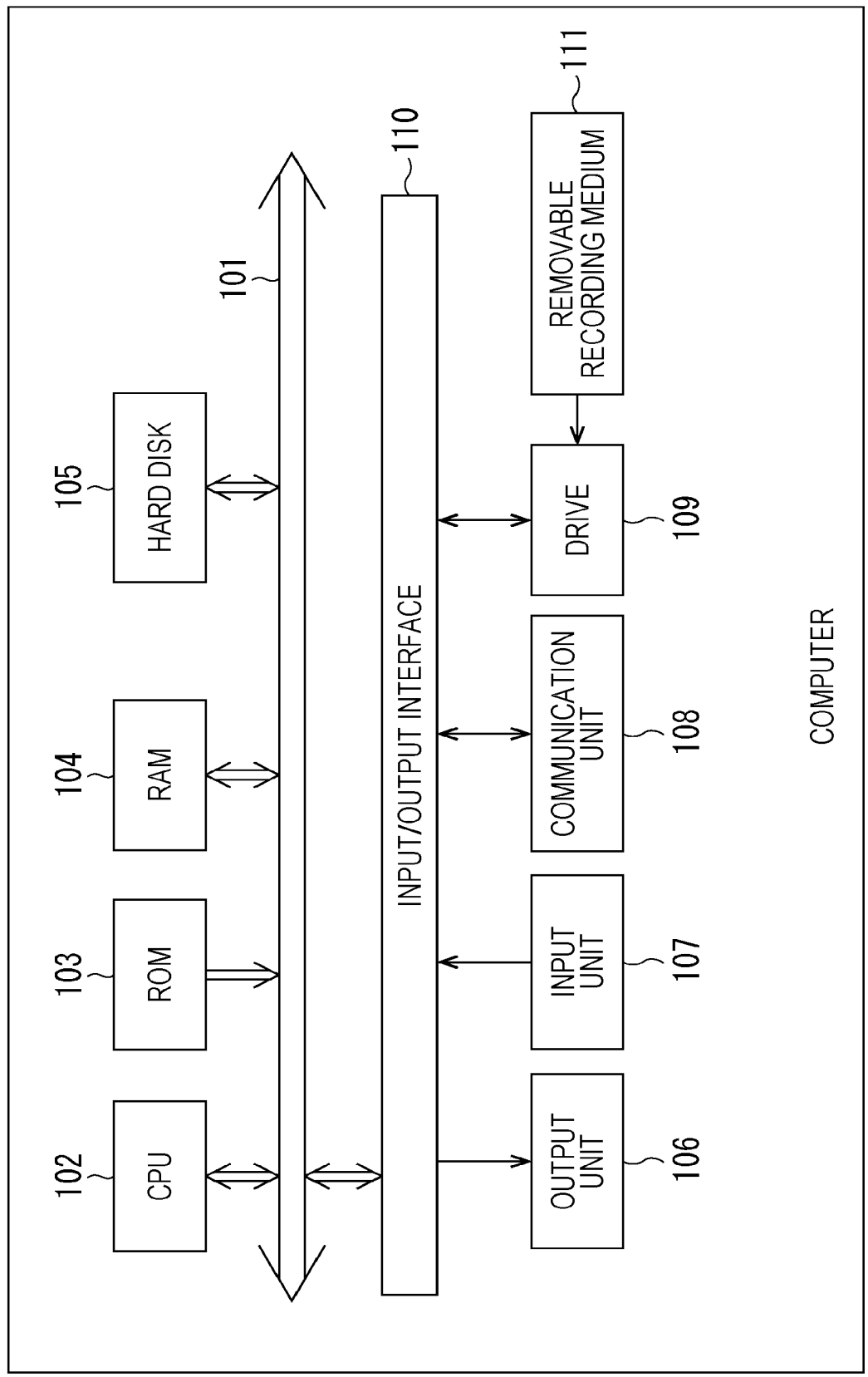

TRANSMITTING DEVICE, TRANSMITTING METHOD, RECEIVING DEVICE, AND RECEIVING METHOD FOR PROVIDING EMERGENCY ALERT INFORMATION

TECHNICAL FIELD

The present technology relates to a transmitting device, a transmitting method, a receiving device, and a receiving method, and more particularly to, a transmitting device, a transmitting method, a receiving device, and a receiving method which are capable of improving, for example, immediacy and flexibility of an alert.

BACKGROUND ART

For example, in terrestrial digital television broadcasting such as Integrated Services Digital Broadcasting-Terrestrial (ISDB-T), it is specified that earthquake motion alert information is transmitted through an auxiliary channel (AC) signal of a physical layer (for example, see Non-Patent Document 1).

Further, the transmission of the earthquake motion alert information using the AC signal is not used at the present time because it is necessary to change facilities or the like.

CITATION LIST

Non-Patent Document

Non-Patent Document 1: "ARIB STD-B 31 2.2 version" Association of Radio Industries and Business

SUMMARY OF THE INVENTION

Problems to be Solved by the Invention

The earthquake motion alert information transmitted through the AC signal has no flexibility or extendibility. In other words, in the earthquake motion alert information transmitted through the AC signal, for example, it is necessary to designate a region which is a target of an earthquake motion alert in fixed units such as prefectures, and it is difficult to designate in other units, for example, in municipal units. Further, the earthquake motion alert information transmitted through the AC signal is configured with a fixed length of bits, but predetermined elements are allocated to all fixed bits serving as the earthquake motion alert information, and it is difficult to add a new element.

By the way, since the AC signal is data of a physical layer, and the data of the physical layer is a small amount of data, a data amount which can be allocated to the AC signal and eventually the earthquake motion alert information is small. Therefore, it is difficult to give flexibility, furthermore, extendibility to the earthquake motion alert information transmitted through the AC signal which is the data of the physical layer.

On the other hand, in higher layers (a data link layer, a network layer, a transport layer, a session layer, a presentation layer, and an application layer of open systems interconnection (OSI) reference model) higher than the physical layer, it is possible to transmit more data than in the physical layer.

Further, in Non-Patent Document 1, an activation flag for activating a receiving device is defined as data of the physical layer.

In this regard, for example, the earthquake motion alert information is considered to have flexibility and extendibility by including the earthquake motion alert information in the data of the higher layer, transmitting the resulting data, activating the receiving device by the activation flag, and causing the receiving device to process the earthquake motion alert information included in the data of the higher layer.

However, since the receiving device is activated in response to the activation flag of the physical layer, and it takes some time to process the data of the higher layer, when the earthquake motion alert information is included in the data of the higher layer and transmitted, there is a lack of immediacy.

Further, in recent years, water damage such as localized heavy rainfall or floods and other disasters (including human-caused disasters caused by human actions as well as natural disasters caused by natural phenomena) are increasing, and the need for alerts against various disasters as well as earthquakes is increasing.

Further, for example, some disasters such as flood damage may occur in a municipality or in some regions in one or more prefectures, not in the whole prefecture, and it is desirable to flexibly designate a region of an alert target and issue an alert against a disaster.

The present technology has made in light of the foregoing, and it is to improve the immediacy and the flexibility of the alert.

Solutions to Problems

A transmitting device of the present technology is a transmitting device, including: a generating unit configured to generate transmission data in which an index associated with predetermined process-related information in a relevant table in which process-related information related to an output process of outputting an alert on a receiving side is registered in association with an index is included in data of a physical layer, the relevant table being included in data of a higher layer higher than the physical layer and supplied; and a transmitting unit configured to transmit the transmission data.

A transmitting method of the present technology is a transmitting method, including: generating transmission data in which an index associated with predetermined process-related information in a relevant table in which process-related information related to an output process of outputting an alert on a receiving side is registered in association with an index is included in data of a physical layer, the relevant table being included in data of a higher layer higher than the physical layer and supplied; and transmitting the transmission data.

In the transmitting device and the transmitting method of the present technology, transmission data in which an index associated with predetermined process-related information in a relevant table in which process-related information related to an output process of outputting an alert on a receiving side is registered in association with an index is included in data of a physical layer is generated and transmitted, the relevant table is included in data of a higher layer higher than the physical layer and supplied.

A receiving device of the present technology is a receiving device, including: a relevant table acquiring unit configured to acquire a relevant table in which process-related information related to an output process of outputting an alert on a receiving side is registered in association with an index, the relevant table being included in data of a higher layer higher than a physical layer and supplied; and a receiving unit configured to receive transmission data in which an index associated with predetermined process-related information in the relevant table is included in data of the physical layer; an index acquiring unit configured to acquire the index included in the data of the physical layer from the transmission data; and a process executing unit configured to execute the output process corresponding to the process-related information associated with the index included in the data of the physical layer in the relevant table.

A receiving method of the present technology is a receiving method, including: acquiring a relevant table in which process-related information related to an output process of outputting an alert on a receiving side is registered in association with an index, the relevant table being included in data of a higher layer higher than a physical layer and supplied; and receiving transmission data in which an index associated with predetermined process-related information in the relevant table is included in data of the physical layer; acquiring the index included in the data of the physical layer from the transmission data; and executing the output process corresponding to the process-related information associated with the index included in the data of the physical layer in the relevant table.

In the receiving device and the receiving method of the present technology, a relevant table in which process-related information related to an output process of outputting an alert on a receiving side is registered in association with an index is acquired, the relevant table is included in data of a higher layer higher than a physical layer and supplied, transmission data in which an index associated with predetermined process-related information in the relevant table is included in data of the physical layer is received, the index included in the data of the physical layer from the transmission data is acquired, and the output process corresponding to the process-related information associated with the index included in the data of the physical layer in the relevant table is executed.

Then, the output process corresponding to the process-related information associated with the index included in the data of the physical layer in the relevant table is executed.

Incidentally, the transmitting device and the receiving device may be independent devices or may be internal blocks constituting a single device.

Further, the transmitting device and the receiving device can be implementing by causing a computer to execute a program. This program can be provided such that it is transmitted via a transmission medium or recorded on a recording medium.

Effects of the Invention

According to the present technology, the immediacy and the flexibility of the alert can be improved.

Further, the effects described here are not necessarily limited, and any effect described in the present disclosure may be included.

BRIEF DESCRIPTION OF DRAWINGS

FIG. 8 is a diagram illustrating an example of a syntax of process index information including a process index associated with process-related information related to an output process of outputting an emergency alert.

FIG. 9 is a diagram for describing EA_status.

FIG. 10 is a diagram for describing location_type.

FIG. 11 is a diagram illustrating a correspondence relation between prefecture codes specified by JIS X 0401 and prefectures indicated by prefectural codes.

FIG. 13 is a diagram for describing expressions of regions using latitude and longitude.

FIG. 14 is a diagram illustrating an example of a syntax of a relevant table in which process-related information related to an output process of outputting an emergency alert is registered.

FIG. 15 is a diagram illustrating an example of emergency alert information EA_message_data serving as process-related information.

FIG. 17 is a diagram illustrating another example of syntax of process index information for emergency alert.

FIG. 18 is a diagram illustrating another example of syntax of an emergency alert table as a relevant table.

FIG. 21 is a diagram illustrating an example of a syntax of process index information including a process index associated with process-related information related to a setting process for performing a channel selection setting.

FIG. 22 is a diagram illustrating an example of syntax of a relevant table in which channel selection information serving as process-related information related to a setting process for performing a channel selection setting is registered.

FIG. 23 is a diagram illustrating an example of a relation between channel numbers and (center) frequencies of channels.

FIG. 24 is a diagram for describing an example of a protocol.

FIG. 25 is a diagram for describing an example of packet_type.

FIG. 26 is a diagram for describing an example of layer_fft_size.

FIG. 27 is a diagram for describing an example of layer_mod.

FIG. 28 is a diagram for describing an example of layer_cod.

FIG. 29 is a diagram for describing an example of layer_gi.

FIG. 30 is a diagram illustrating an example of a location code location_code serving as a process index registered in a channel selection information table and channel selection information associated with the location code location_code.

FIG. 33 is a block diagram illustrating a configuration example of one embodiment of a computer to which the present technology is applied.

MODE FOR CARRYING OUT THE INVENTION

One Embodiment of Transmission System to which Present Technology is Applied

Figure 1:
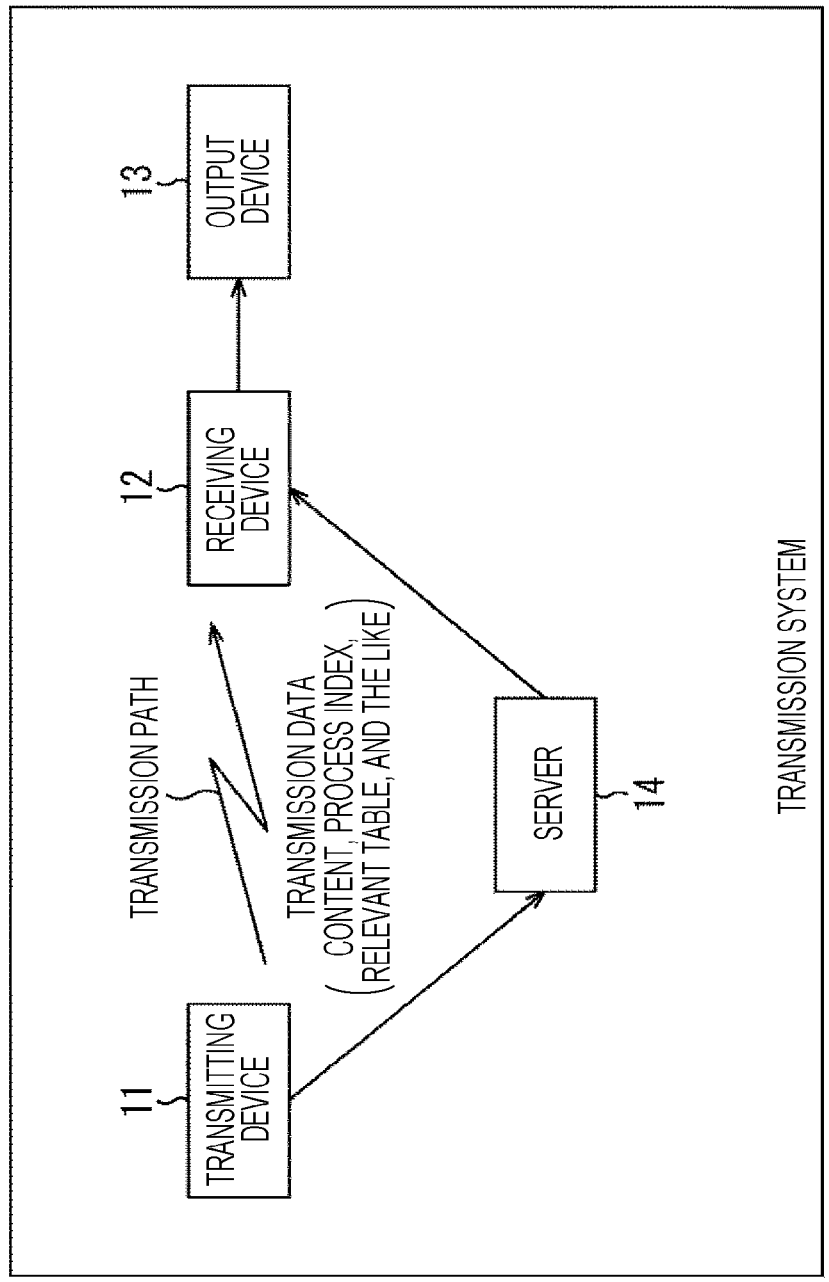
FIG. 1 is a block diagram illustrating a configuration example of one embodiment of a transmission system to which the present technology is applied.

FIG. 1 is a block diagram illustrates a configuration example of one embodiment of a transmission system to which the present technology is applied (a system refers to a logical aggregation of a plurality of devices and is not limited to one in which devices of respective components are within a single housing).

In FIG. 1, a transmission system includes a transmitting device 11, a receiving device 12, an output device 13, and a server 14.

The transmitting device 11 performs transmission (broadcast) (transmission) of, for example, television broadcast programs and the like. In other words, the transmitting device 11 regards content of a program such as image data or sound data as target data to be transmitted, and performs a transmission process necessary for the target data, for example. The transmitting device 11 transmits transmission data obtained by performing the transmission process on the target data via a transmission path such as a satellite line, a terrestrial wave, a cable (wired line), or the like, for example.

The transmission data transmitted by the transmitting device 11 includes a process index in addition to the content of the program. Further, the transmission data includes a relevant table if necessary.

Here, process-related information related to processes on a receiving side, that is, processes performed in the receiving device 12 is registered in the relevant table in association with the process index. The process index is an index associated with the process-related information.

The process index is included in data of the physical layer of the transmission data. The relevant table is included in data of a higher layer higher than the physical layer of the transmission data if necessary. The content of the program is data of an application layer, but the relevant table can be included in the data of the application layer, similarly to the content of the program or can be included in data of other higher layers.

The receiving device 12 receives the transmission data transmitted from the transmitting device 11 via the transmission path, reconstructs the content of the program included in the transmission data, and supplies the content of the program to the output device 13.

Further, the receiving device 12 acquires the relevant table included in the data of the higher layer of the transmission data or the process table included in the data of the physical layer of the transmission data, and executes a process corresponding to the process-related information associated with the process index included in the data of the physical layer (hereinafter also referred to as a "relevant process") in the relevant table.

The output device 13 includes a display that displays an image or a speaker that outputs a sound, and displays an image serving as content or the like from the receiving device 12 and outputs a sound.

The server 14 is, for example, a webserver and acquires the relevant table from the transmitting device 11 or the like if necessary. Further, if necessary, the server 14 includes the relevant table in the data of the higher layer (for example, data of a hypertext transfer protocol (HTTP) or the like) and provides the data to the receiving device 12 through communication via the Internet.

As described above, the relevant table is included in the data of the higher layer of the transmission data transmitted by the transmitting device 11 and supplied but can be included in the data of the higher layer and supplied from the server 14.

The receiving device 12 can acquire the relevant table which is included in the data of the higher layer and supplied from the server 14 in addition to the relevant table which is included in the data of the higher layer of the transmission data transmitted by the transmitting device 11 and supplied.

The relevant table can be supplied from both the transmitting device 11 and the server 14 or can be supplied from only one of the transmitting device 11 and the server 14.

Hereinafter, in order to simplify the description, for example, the relevant table is assumed to be included in the data of the higher layer of the transmission data and provided from the transmitting device 11 to the receiving device 12.

Hereinafter, the data of the physical layer and the data of the higher layer are also referred to as physical layer data and higher layer data, respectively.

Configuration Example of Transmitting Device 11

Figure 2:
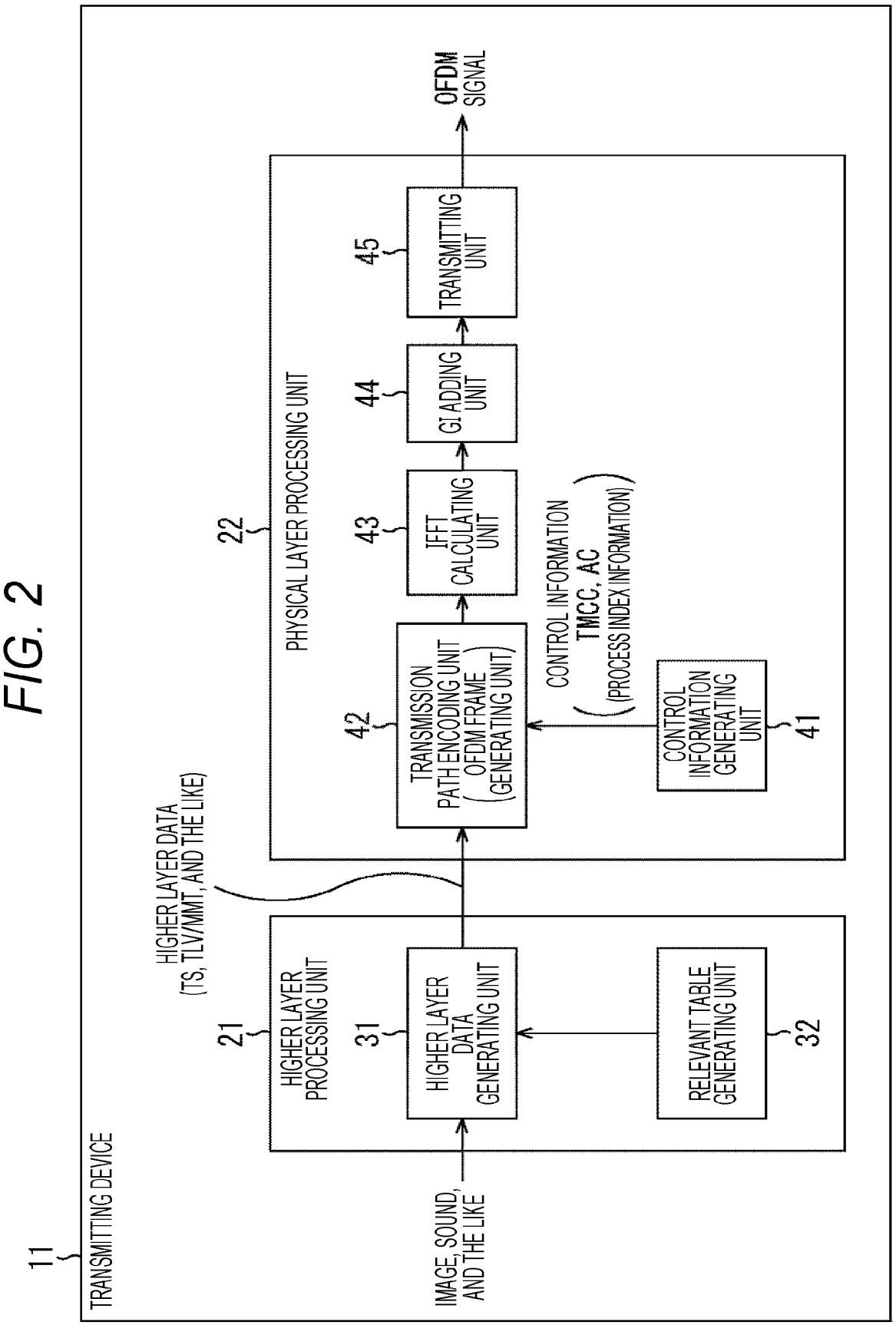
FIG. 2 is a block diagram illustrating a configuration example of a transmitting device 11.

FIG. 2 is a block diagram illustrating a configuration example of the transmitting device 11 of FIG. 1.

In FIG. 2, the transmitting device 11 includes, for example, a transmitting device using a transmission scheme of ISDB-T, and includes a higher layer processing unit 21 and a physical layer processing unit 22.

Images, sounds, and the like of the content of the programs are supplied to the higher layer processing unit 21.

The higher layer processing unit 21 performs a higher layer process of generating higher layer data having a format specified in a higher layer from an image, a sound, or the like of the content of the program, and supplies the higher layer data to the physical layer processing unit 22.

In other words, the higher layer processing unit 21 includes a higher layer data generating unit 31 and a relevant table generating unit 32.

To the higher layer data generating unit 31, the image, the sound, or the like of the content of the program is supplied, and the relevant table is supplied from the relevant table generating unit 32.

For example, the higher layer data generating unit 31 encodes the image or the sound of the content of the program, generates the higher layer data including the encoded image or sound, furthermore, the relevant table or the like from the relevant table generating unit 32 and supplies the higher layer data to the physical layer processing unit 22.

As the higher layer data, for example, a stream such as a transport stream (TS), a type length value (TLV)/MPEG media transport (MMT), or the like can be employed.

The relevant table generating unit 32 generates the relevant table in which the process index and the process-related information are associated with each other, and supplies the relevant table to the higher layer data generating unit 31.

The physical layer processing unit 22 processes the physical layer process on the higher layer data from the higher layer processing unit 21, and transmits, for example, an orthogonal frequency division multiplexing (OFDM) signal serving as transmission data obtained as a result of the physical layer process.

In other words, the physical layer processing unit 22 includes a control information generating unit 41, a transmission path encoding unit 42, an inverse fast Fourier transform (IFFT) calculating unit 43, a guard interval (GI) adding unit 44, and a transmitting unit 45.

The control information generating unit 41 generates physical layer data serving as control information. For example, in ISDB-T, a transmission and multiplexing configuration and control (TMCC) signal and an AC signal are physical layer data serving as the control information. Further, in Non-Patent Document 1, the TMCC signal is dealt as the control information, and the AC signal is dealt as additional information, but in this specification, in order to simplify the description, both the TMCC signal and the AC signal are assumed to be referred to as control information.

The control information generating unit 41 generates the process index information including the process index associated with a predetermined process-related information registered in the relevant table generated by the relevant table generating unit 32 as part of the control information.

The control information generating unit 41 supplies the physical layer data serving as the control information to the transmission path encoding unit 42.

In addition to the control information from the control information generating unit 41, the higher layer data is supplied from the higher layer processing unit 21 (the higher layer data generating unit 31) to the transmission path encoding unit 42.

The transmission path encoding unit 42 performs predetermined transmission path encoding on the higher layer data from the higher layer processing unit 21 and generates an OFDM frame in which the control information from the control information generating unit 41, furthermore, a necessary pilot signal are added to the higher layer data as the physical layer data.

Therefore, the transmission path encoding unit 42 functions as an OFDM frame generating unit that generates an OFDM frame.

Here, for example, in the transmission path encoding of ISDB-T, for example, error correction coding of the higher layer data, mapping serving as sub carrier modulation (mapping of the higher layer data onto an IQ constellation), frequency interleaving, time interleaving, addition of control information and a pilot signal, and the like are performed, and 13 OFDM segments are configured. Then, one OFDM frame is configured with the 13 OFDM segments.

After generating the OFDM frame, the transmission path encoding unit 42 supplies the OFDM frame to the IFFT calculating unit 43.

The IFFT calculating unit 43 performs IFFT on the OFDM frame supplied from the transmission path encoding unit 42 as a signal in a frequency domain, converts the OFDM frame into an OFDM frame in a time domain, and supplies the OFDM frame to the GI adding unit 44.

The GI adding unit 44 constitutes an OFDM signal serving as the transmission data by adding a GI having a length corresponding to 1 of an integer of a symbol length of an OFDM symbol to each of OFDM symbols constituting the OFDM frame in the time domain from the IFFT calculating unit 43, and supplies the OFDM signal to the transmitting unit 45.

The transmitting unit 45 performs frequency transform on the transmission data from the GI adding unit 44 and transmits the OFDM signal serving as the transmission data which has undergone the frequency transform.

Figure 3:
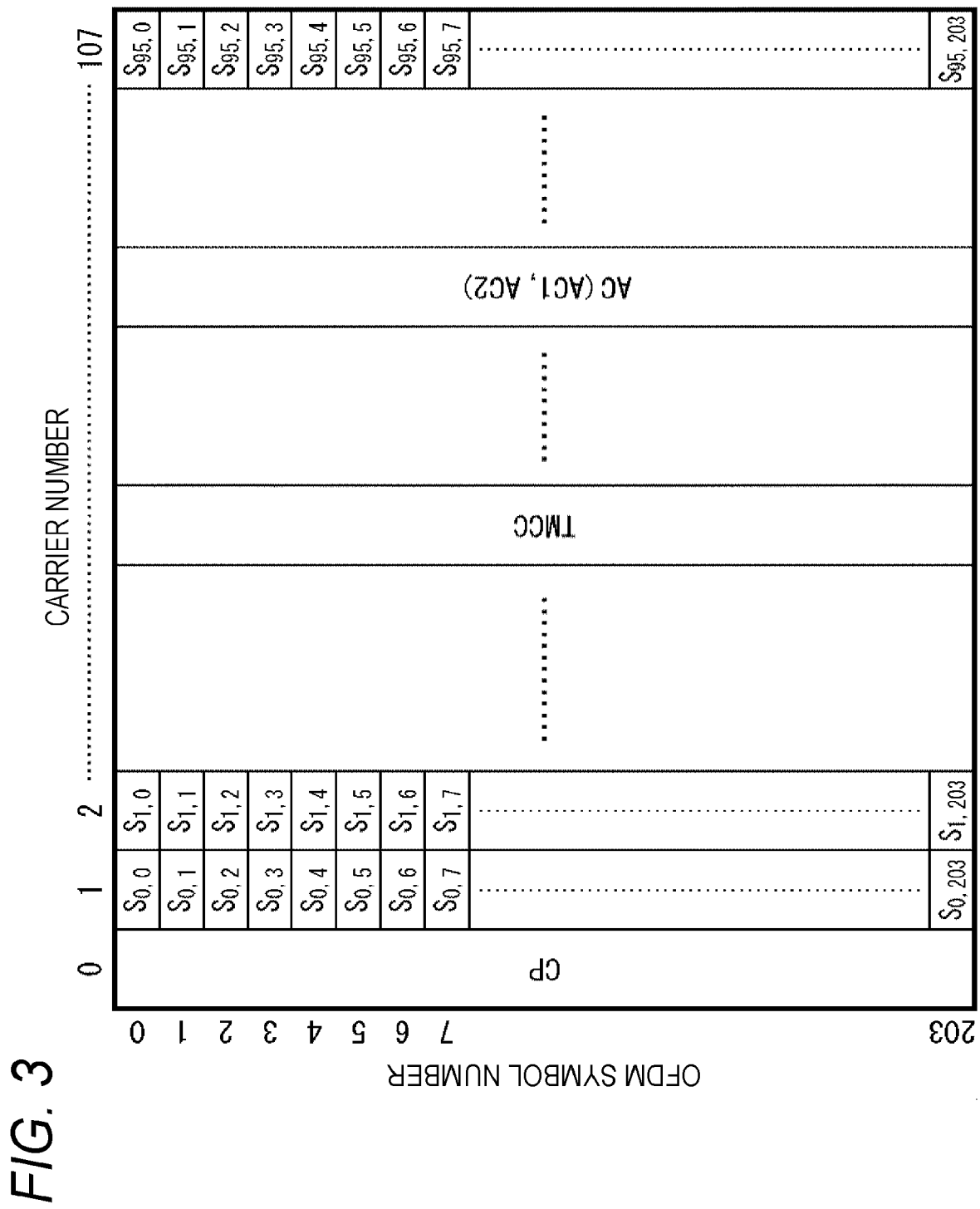
FIG. 3 is a diagram illustrating an OFDM segment of ISDB-T.

FIG. 3 is a diagram illustrating an OFDM segment of ISDB-T.

In ISDB-T, three transmission modes of modes 1, 2, and 3 in which intervals of OFDM sub carriers are different are specified. Further, in ISDB-T, four modulation schemes, that is, quaternary phase shift keying (QPSK), quadrature amplitude modulation (16 QAM), 64 QAM, and differential QPSK (DQPSK) are specified as a sub carrier modulation scheme.

FIG. 3 illustrates an OFDM segment in which the transmission mode is the mode 1, and the modulation scheme is DQPSK.

In FIG. 3, a horizontal axis is a frequency axis indicating a sub carrier number (carrier number). One row in a horizontal direction indicates an OFDM symbol. Further, a vertical axis is a time axis indicating a number of an OFDM symbol (an OFDM symbol number).

204 OFDM symbols constitute one OFDM frame.

In FIG. 3, $S_{i,j}$ indicates a data symbol (a carrier symbol) of a sub carrier modulated with the higher layer data, and the OFDM segment (OFDM frame) is constituted such that each symbol (sub carrier) of a continual pilot (CP) which is a pilot signal, the TMCC signal, and the AC signal is added to a data symbol.

The transmission path encoding unit 42 of FIG. 2 can generate, for example, an OFDM frame or the like equivalent to an OFDM frame constituted by the OFDM segment of FIG. 3.

In this case, the process index information can be included in the TMCC signal or the AC signal serving as the physical layer data.

Figure 4:
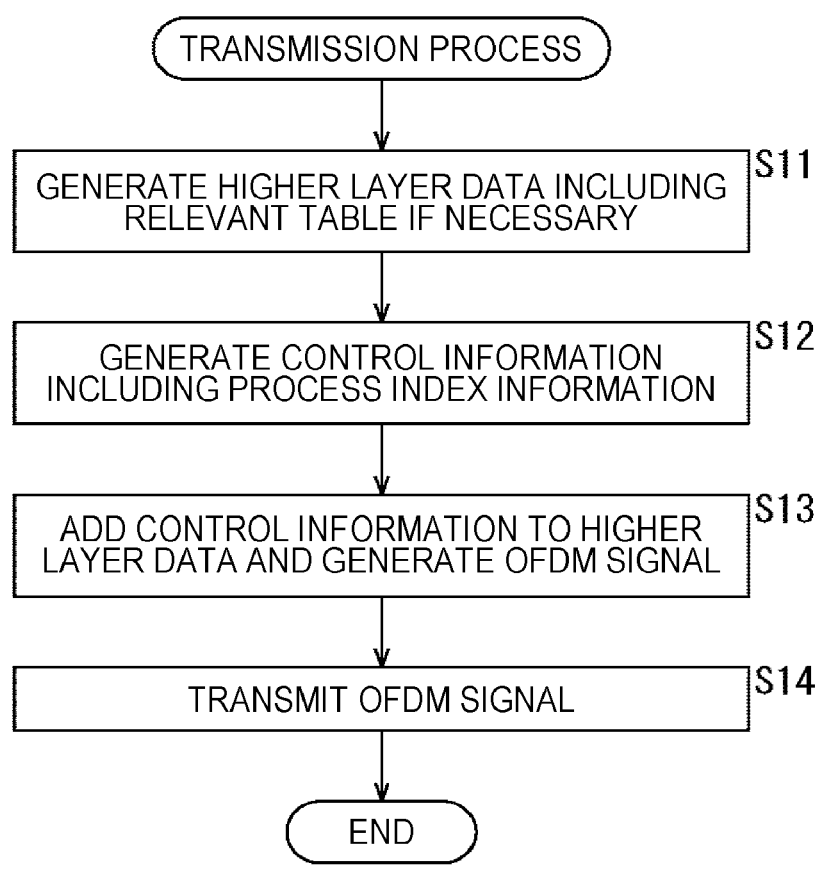
FIG. 4 is a flowchart illustrating a transmission process performed by a transmitting device 11.

FIG. 4 is a flowchart illustrating a transmission process performed by the transmitting device 11 of FIG. 2.

In the transmission process, the OFDM signal serving as the transmission data is generated and transmitted.

Specifically, in step S22, the higher layer processing unit 21 generates the higher layer data including the relevant table and the like and supplies the higher layer data to the physical layer processing unit 22, and the process proceeds to step S12.

In other words, in the higher layer processing unit 21, the relevant table generating unit 32 generates the relevant table in which the process index and the process-related information are associated with each other, and supplies the relevant table to the higher layer data generating unit 31.

The higher layer data generating unit 31 encodes, for example, the image and the sound of the content of the program, generates the higher layer data including the encoded image and sound, the relevant table from the relevant table generating unit 32, and the like, and supplies the higher layer data to the physical layer processing unit 22.

In step S12, the control information generating unit 41 generates the control information including the process index information, and the process proceeds to step S13.

In other words, the control information generating unit 41 generates the process index information including the process index associated with the predetermined process-related information registered in the relevant table generated by the relevant table generating unit 32.

Further, the control information generating unit 41 generates, for example, the control information (the TMCC signal or the AC signal) which is the physical layer data, and includes the process index information in part of the control information.

In step S13, the physical layer processing unit 22 adds the control information which is the physical layer data generated by the control information generating unit 41 to the higher layer data from the higher layer processing unit 21, generates, for example, the OFDM signal serving as the transmission data, and the process proceeds to step S14.

In other words, in the physical layer processing unit 22, the higher layer data from the higher layer processing unit 21 is supplied to the transmission path encoding unit 42, and the control information which is the physical layer data generated by the control information generating unit 41 is supplied to the transmission path encoding unit 42.

The transmission path encoding unit 42 performs the predetermined transmission path encoding on the higher layer data from the higher layer processing unit 21, and generates the OFDM frame in which the control information from the control information generating unit 41, furthermore, the necessary pilot signal are added to the higher layer data as the physical layer data. The OFDM frame is supplied from the transmission path encoding unit 42 to the IFFT calculating unit 43.

The IFFT calculating unit 43 performs the IFFT on the OFDM frame from the transmission path encoding unit 42, obtains the OFDM frame in the time domain, and supplies the OFDM frame to the GI adding unit 44.

The GI adding unit 44 adds the GI to each OFDM symbol constituting the OFDM frame in the time domain from the IFFT calculating unit 43, constructs the OFDM signal serving as the transmission data, and supplies the OFDM signal to the transmitting unit 45.

In step S14, the transmitting unit 45 performs the frequency transform on the transmission data from the GI adding unit 44, and transmits the OFDM signal serving as the transmission data which has undergone the frequency transform.

In the transmitting device 11, the transmission process is repeated in a pipeline.

Configuration Example of Receiving Device 12

Figure 5:
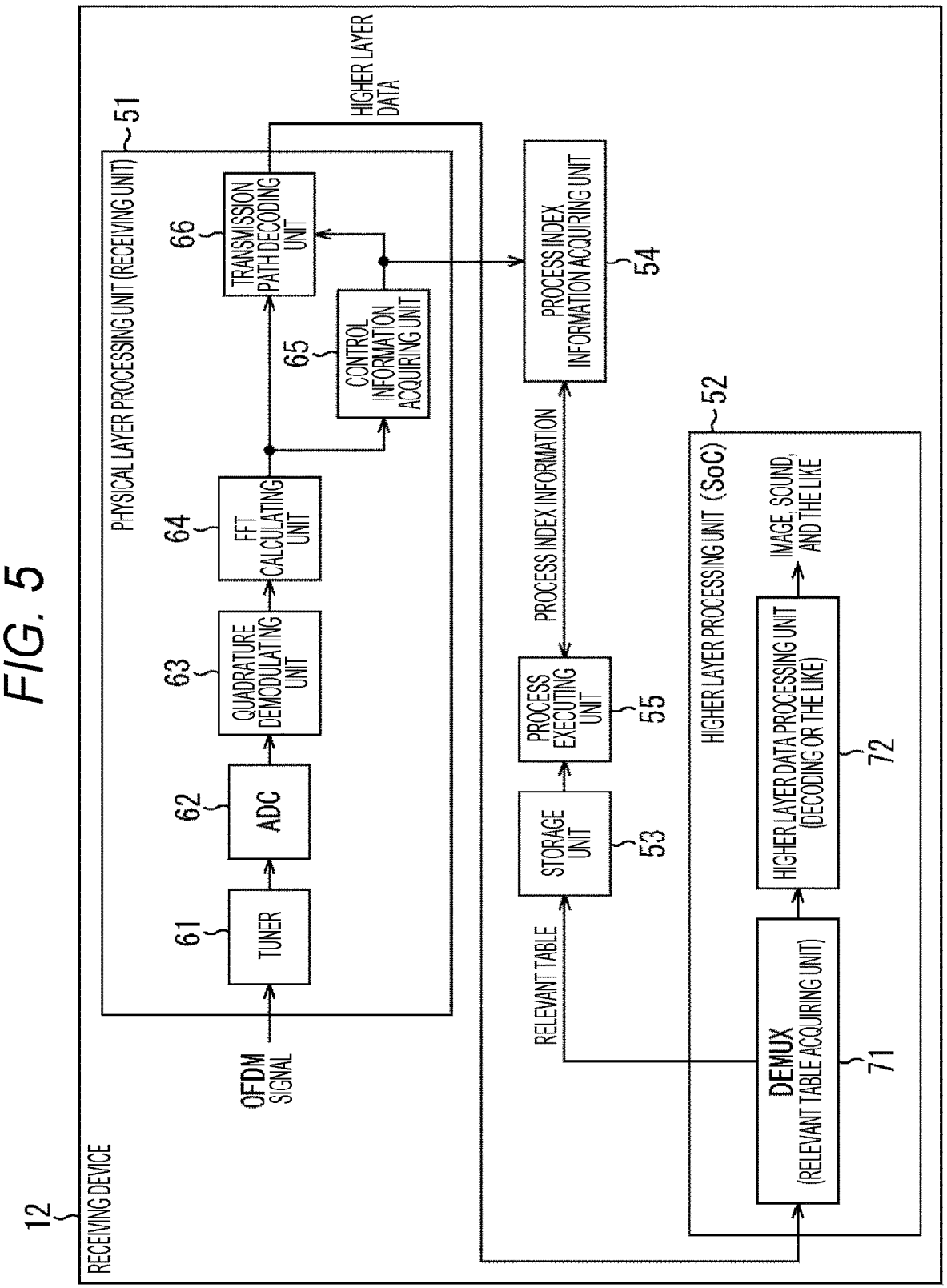
FIG. 5 is a block diagram illustrating a configuration example of a receiving device 12.

FIG. 5 is a block diagram illustrating a configuration example of the receiving device 12 of FIG. 1.

In FIG. 5, for example, the receiving device 12 is a receiving device using a transmission scheme of ISDB-T and includes a physical layer processing unit 51, a higher layer processing unit 52, a storage unit 53, a process index information acquiring unit 54, and a process executing unit 55.

The physical layer processing unit 51 functions as a receiving unit that receives the OFDM signal serving as the transmission data transmitted from the transmitting device 11, and performs the physical layer process as the transmission data.

In other words, the physical layer processing unit 51 includes a tuner 61, an analog to digital converter (ADC) 62, a quadrature demodulating unit 63, an FFT calculating unit 64, a control information acquiring unit 65, and a transmission path decoding unit 66.

The tuner 61 receives an OFDM signal as transmission data of a predetermined channel (frequency band) transmitted from the transmitting device 11, and supplies the OFDM signal to the ADC 62.

The ADC 62 performs AD conversion on the OFDM signal serving as the transmission data from the tuner 61 and supplies the resulting OFDM signal to the quadrature demodulating unit 63.

The quadrature demodulating unit 63 performs quadrature demodulation on the OFDM signal serving as the transmission data from the ADC 62 and supplies the resulting OFDM signal to the FFT calculating unit 64.

The FFT calculating unit 64 convert the OFDM signal from the quadrature demodulating unit 63 as the signal in the time domain it into the OFDM signal in the frequency domain by perform the FFT, and supplies the resulting OFDM signal to the control information acquiring unit 65 and the transmission path decoding unit 66.

The control information acquiring unit 65 acquires, for example, the TMCC signal or the AC signal serving as the control information which is the physical layer data from the OFDM signal from the FFT calculating unit 64, and supplies the TMCC signal or the AC signal to the process index information acquiring unit 54 and the transmission path decoding unit 66.

The transmission path decoding unit 66 performs predetermined transmission path decoding on the OFDM signal from the FFT calculating unit 64 using the control information supplied from the control information acquiring unit 65, reconstructs the higher layer data, and supplies the higher layer data to the higher layer processing unit 52.

Here, in the transmission path decoding of ISDB-T, for example, time deinterleaving, frequency deinterleaving, demapping serving as sub carrier demodulation, error correction decoding, and the like are performed, for example, and the higher layer data is reconstructed. The TMCC signal serving as the control information includes information such as the sub carrier modulation scheme, for example, and the transmission path decoding is performed using the TMCC signal serving as the control information supplied from the control information acquiring unit 65 to the transmission path decoding unit 66 if necessary.

The higher layer processing unit 52 is configured with, for example, a system on chip (SoC), and performs the higher layer process on the higher layer data from (the transmission path decoding unit 66 of) the physical layer processing unit 51.

In other words, the higher layer processing unit 52 includes a DEMUX 71 and a higher layer data processing unit 72.

The higher layer data from the physical layer processing unit 51 is supplied to the DEMUX 71.

The DEMUX 71 separates the encoded image and sound from the higher layer data from the physical layer processing unit 51, and supplies the encoded image and sound to the higher layer data processing unit 72.

Further, the DEMUX 71 acquires the relevant table by separating the relevant table from the higher layer data from the physical layer processing unit 51, and supplies the relevant table to the storage unit 53.

Therefore, the DEMUX 71 functions as a relevant table acquiring unit that acquires the relevant table.

The higher layer data processing unit 72 decodes the encoded image and sound from the DEMUX 71 and supplies the decoded image and sound to the output device 13 (FIG. 1).

The storage unit 53 stores the relevant table supplied from the DEMUX 71.

The process index information acquiring unit 54 acquires the process index information included in the control information serving as the physical layer data from the control information acquiring unit 65 and supplies the process index information to the process executing unit 55.

The process executing unit 55 acquires the process-related information associated with the process index included in the process index information from the process index information acquiring unit 54 in the relevant table as information of interest with reference to the relevant table stored in the storage unit 53. Then, the process executing unit 55 executes a process corresponding to the information of interest (a relevant process).

Here, in a case where the receiving device 12 is powered off, the higher layer processing unit 52 which performs the process of the higher layer higher than the physical layer enters the power-off state, but the physical layer processing unit 51 that performs the physical layer process executes at least a process necessary for acquiring the control information without entering the power-off state.

Further, in the receiving device 12, the storage unit 53, the process index information acquiring unit 54, and the process executing unit 55 continue to operate without entering the power-off state.

Therefore, in the receiving device 12, even in the power-off state, the control information acquiring unit 65 can acquire the control information which is the physical layer data, and the process index information acquiring unit 54 can acquire the process index information included in the control information which is the physical layer data. Further, the process executing unit 55 can acquire the process-related information associated with the process index included in the process index information acquired by the process index information acquiring unit 54 as the information of interest in the relevant table stored in the storage unit 53 and execute the relevant process in accordance with the information of interest.

Figure 6:
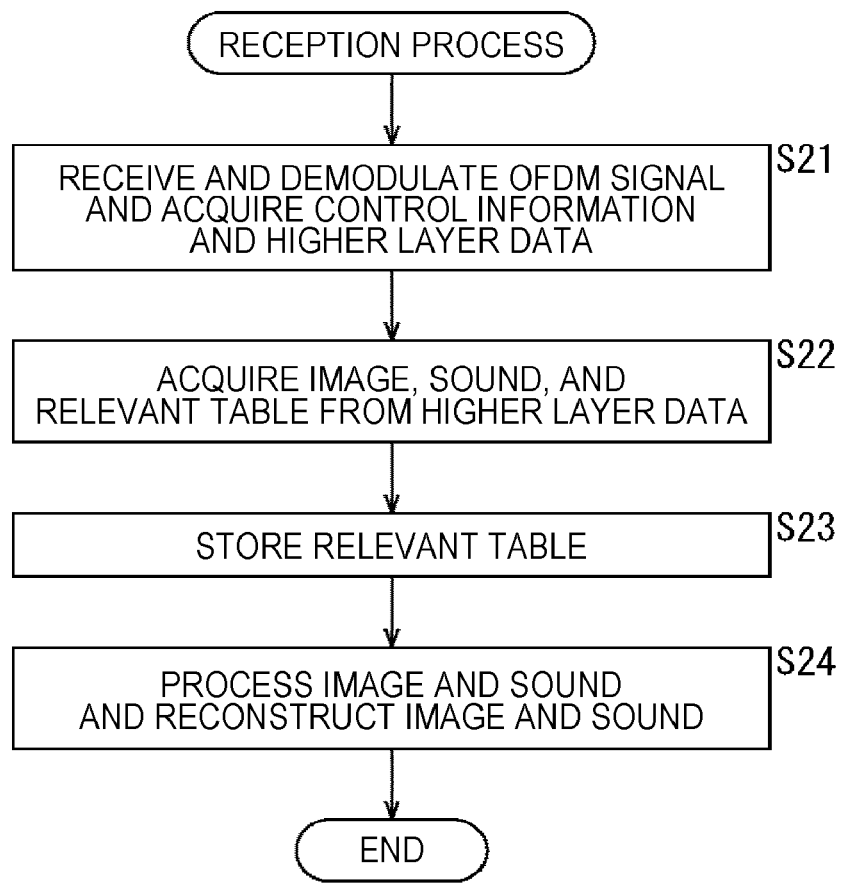
FIG. 6 is a flowchart illustrating a reception process performed by a receiving device 12.

FIG. 6 is a flowchart illustrating a reception process performed by the receiving device 12 of FIG. 5.

In the reception process, the OFDM signal serving as the transmission data is received, and the higher layer process for acquiring the image and the sound included in the higher layer data included in the OFDM signal is performed.

Specifically, in step S21, the physical layer processing unit 51 receives and demodulates the OFDM signal serving as the transmission data transmitted from the transmitting device 11, and acquires the control information which is the physical layer data and the higher layer data, and the process proceeds to step S22.

In other words, in the physical layer processing unit 51, the tuner 61 receives the OFDM signal serving as the transmission data transmitted from the transmitting device 11, and supplies the OFDM signal to the ADC 62. The ADC 62 performs the AD conversion on the OFDM signal from the tuner 61 and supplies the resulting OFDM signal to the quadrature demodulating unit 63. The quadrature demodulating unit 63 performs quadrature demodulation on the OFDM signal from the ADC 62 and supplies the demodulated OFDM signal to the FFT calculating unit 64. The FFT calculating unit 64 performs the FFT on the OFDM signal from the quadrature demodulating unit 63 and supplies the OFDM signal which has undergone the FFT to the control information acquiring unit 65 and the transmission path decoding unit 66.

The control information acquiring unit 65 acquires the control information which is the physical layer data from the OFDM signal from the FFT calculating unit 64 and supplies the control information to the process index information acquiring unit 54 and the transmission path decoding unit 66.

The transmission path decoding unit 66 reconstructs the higher layer data by performing the transmission path decoding on the OFDM signal from the FFT calculating unit 64 by using the control information from the control information acquiring unit 65 and supplies the higher layer data to the higher layer processing unit 52.

In step S22, in the higher layer processing unit 52, the DEMUX 71 separates the encoded image and sound from the relevant table from the higher layer data from (the transmission path decoding unit 66 of) the physical layer processing unit 51.

Then, the DEMUX 71 supplies the encoded image and sound to the higher layer data processing unit 72, and also supplies the relevant table to the storage unit 53, and the process proceeds from step S22 to step S23.

In step S23, the storage unit 53 stores the relevant table supplied from the DEMUX 71, and the process proceeds to step S24. In other words, the storage unit 53 updates storage content with the relevant table supplied from the DEMUX 71. Therefore, in a case where the relevant table previously supplied from the DEMUX 71 is already stored in the storage unit 53, the storage content of the storage unit 53 is updated with the latest relevant table supplied from the DEMUX 71.

In step S24, the higher layer data processing unit 72 reconstructs the original image and sound by performing a process such as decoding of the encoded image and sound from the DEMUX 71, and supplies the original image and sound to the output device 13 (FIG. 1).

In the receiving device 12, the above reception process is repeated in the pipeline.

Further, in the receiving device 12, the entire reception process is performed in the power-on state.

Further, in the receiving device 12, in the power-on state, at least the process for the physical layer data in the reception process is performed. In other words, in step S21, at least the process of receiving and demodulating the OFDM signal serving as the transmission data transmitted from the transmitting device 11, acquiring the control information which is the physical layer data, and supplying the control information to the process index information acquiring unit 54 is performed.

Figure 7:
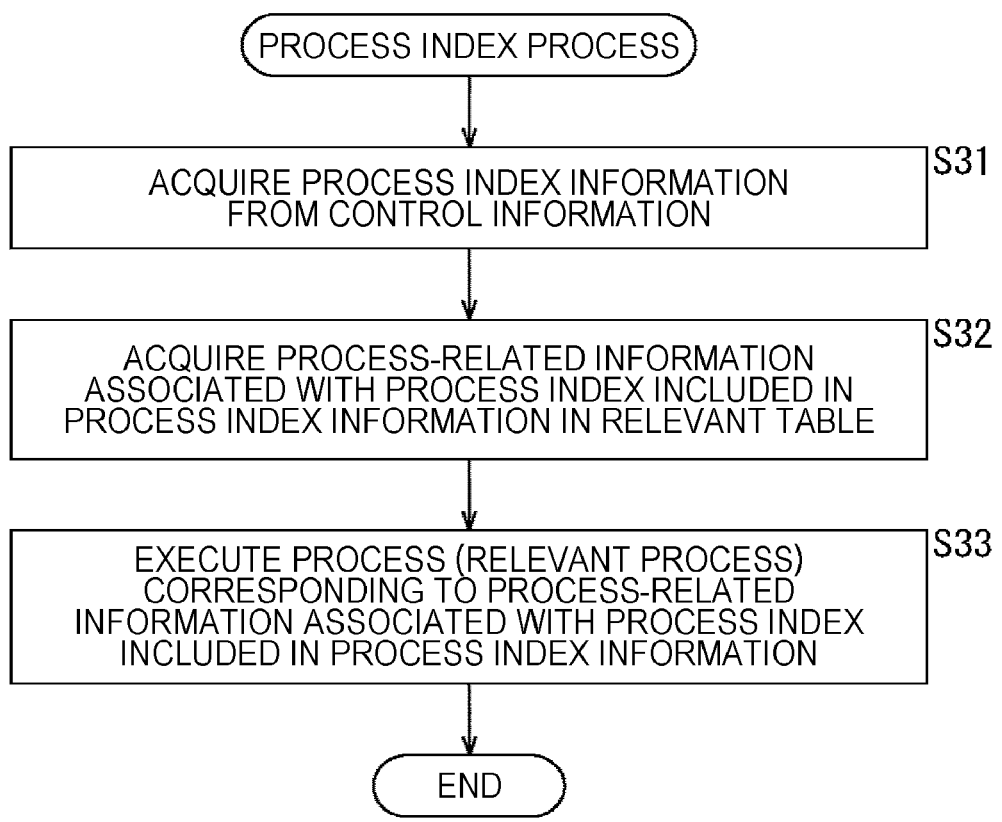
FIG. 7 is a flowchart illustrating an example of a process index process performed by a receiving device 12.

FIG. 7 is a flowchart illustrating an example of the process index process performed by the receiving device 12 of FIG. 5.

In the process index process, the process index information included in control information which is the physical layer data of the transmission data is processed.

Specifically, in step S31, the process index information acquiring unit 54 acquires the process index information included in the control information from the control information acquiring unit 65 and supplies the process index information to the process executing unit 55, and the process returns to step S32.

In step S32, the process executing unit 55 acquires the process-related information associated with the process index included in the process index information from the process index information acquiring unit 54 in the relevant table stored in the storage unit 53 as the information of interest, and the process proceeds to step S33.

In step S33, the process executing unit 55 executes the relevant process corresponding to the process-related information acquired as the information of interest.

In the receiving device 12, the above process index process is repeated in the pipeline.

Further, in the receiving device 12, even in the power-off state, the storage unit 53, the process index information acquiring unit 54, and the process executing unit 55 continue to operate as described above with reference to FIG. 5. The process index process of FIG. 7 is a process performed by the storage unit 53, the process index information acquiring unit 54, and the process executing unit 55 and thus performed even in the case which the receiving device 12 is powered off.

As described above, in the transmitting device 11, the transmission data in which the process index information including the process index associated with the predetermined process-related information in the relevant table which is included in the higher layer data and supplied is included in the physical layer data is generated and transmitted.

On the other hand, in the receiving device 12, the relevant table which is included in the higher layer data and supplied is acquired, whereas the process index information including the process index associated with the predetermined process-related information in the relevant table which is included in the higher layer data and supplied is included in the physical layer data is received, and the process index information (the process index) included in the physical layer data of the transmission data is acquired. Further, the relevant process corresponding to the process-related information associated with the process index included in the process index information included in the physical layer data in the relevant table is executed.

Therefore, it is possible to easily perform the process which is high in immediacy and flexibility, furthermore, extendibility as the relevant process.

In other words, in the receiving device 12, the physical layer data of the transmission data is initially processed and processed even when the receiving device 12 is powered off, and thus the excellent immediacy is implemented.

However, an information amount which is included in the physical layer data of the transmission data and transmitted is generally small. For example, the information amount transmitted through the AC signal used for transmission of the earthquake motion alert information specified in Non-Patent Document 1 is 204 bits at most. With such a small information amount, it is difficult to perform the process with flexibility and extendibility as the process of outputting the earthquake motion alert.

On the other hand, with the higher layer data of the transmission data, it is possible to transmit a large amount of information, and with such a large amount of information, the process with high flexibility or extendibility can be easily performed.

In other words, for example, in a case where the earthquake motion alert information is included in the higher layer data and transmitted, it is possible to easily change and extend the earthquake motion alert information, and as a result, the process with the flexibility or the extendibility can be performed as the process of outputting the earthquake motion alert.

However, in a case where the SoC serving as the higher layer processing unit 52 that processes the higher layer data of the transmission data is activated from the power-off state in accordance with the activation flag specified in ISDB-T, for example, it takes some time for the activation.

Further, in the higher layer processing unit 52, the DEMUX 71 performs a filter process of separating various kinds of data from the higher layer data. For this reason, in a case where the earthquake motion alert information is included in the higher layer data and transmitted, a delay occurs due to the filter process when the earthquake motion alert information is obtained from the higher layer data.

Therefore, it is difficult to secure the immediacy in a case where the earthquake motion alert information is included in the higher layer data and transmitted.

Further, in a case where the earthquake motion alert information is included in the higher layer data and transmitted, part of (information for) signaling periodically arranged in the higher layer data can be used as the earthquake motion alert information. However, since a period of the signaling of the higher layer data is generally long, even in a case where part of the signaling of the higher layer data is used as the earthquake motion alert information, it is still difficult to secure the immediacy.

On the other hand, in the transmission system of FIG. 1, the relevant table in which the process-related information related to the process performed in the receiving device 12 is registered in association with the process index is included in the higher layer data and supplied, and the receiving device 12 acquires the relevant table which is included in the higher layer data and supplied.

The relevant table which is included in the higher layer data and supplied is rarely subjected to the strict information amount constraint, and thus it is possible to register the process-related information related to various processes (relevant processes). Further, in the receiving device 12, the relevant table stored in the storage unit 53 is updated with the latest relevant table. As a result, the process with high flexibility or extendibility can be easily performed as the relevant process corresponding to the process-related information registered in the relevant table.

Further, in the transmitting device 11, the transmission data in which the process index information including the process index is included in the physical layer data is generated and transmitted.

Further, in the receiving device 12, the transmission data from the transmitting device 11 is received, and the process index included in the process index information included in the physical layer data of the transmission data is acquired. Further, in the receiving device 12, the relevant process corresponding to the process-related information associated with the process index acquired from the physical layer data of the transmission data in the relevant table which is acquired in advance from the higher layer data and stored in the storage unit 53 is executed.

It is possible to reduce the information amount of the process index information included in the physical layer data by a degree that the process index (including the process index information) is included in the physical layer data of the transmission data, and the relevant table is included in the higher layer data and transmitted. As a result, the receiving device 12 can immediately acquire the process index included in the physical layer data.

Therefore, the receiving device 12 can immediately execute the relevant process corresponding to the process-related information associated with the process index acquired from the physical layer data of the transmission data.

The relevant table and the process index (information) will be described below in detail using a case where, for example, an output process of outputting an emergency alert and a setting process of performing a channel selection setting are employed as the relevant processes corresponding to the process-related information as an example.

Example of Relevant Table in which Process Related Information Related to Output Process of Outputting Emergency Alert is Registered and Process Index Information Including Process Index Associated with Process-Related Information FIG. 8 is a diagram illustrating an example of a syntax of the process index information including the process index associated with the process-related information related to the output process of outputting the emergency alert.

Here, hereinafter, the process index information including the process index associated with the process-related information related to the output process of outputting the emergency alert is also referred to as emergency alert process index information.

In FIG. 8, the emergency alert process index information includes 1-bit EA_EXIST_FLAG. Further, the emergency alert process index information includes 8-bit version and 8-bit NUM_EA_MESSAGE if necessary.

Further, the emergency alert process index information includes sets of 8-bit EA_code, 2-bit EA_status, 3-bit location_type, location_length having a variable length, and location_code having a variable length which correspond in number to a number indicated by NUM_EA_MESSAGE.

EA_EXIST_FLAG is a flag indicating whether or not there is information subsequent to EA_EXIST_FLAG in the emergency alert process index information.

In a case where EA_EXIST_FLAG indicates that there is subsequent information, version and NUM_EA_MESSAGE are arranged subsequently to EA_EXIST_FLAG.

Version indicates a version of the emergency alert process index information. For example, version is incremented by 1 each time the emergency alert process index information is updated.

NUM_EA_MESSAGE indicates the number of EA_codes serving as the process index to be arranged subsequently thereto.

Sets of EA_code, EA_status, location_type, location_length, and location_code which correspond in number to a number indicated by NUM_EA_MESSAGE are repeatedly arranged after NUM_EA_MESSAGE.

EA_code is a process index associated with emergency alert information indicating content of the emergency alert serving as the process-related information related to the output process of outputting the emergency alert. Hereinafter, EA_code is also referred to as a disaster type code EA_code.

EA_status indicates a status of the emergency alert.
location_type indicates a type of location_code.
location_length indicates a length (size) of location_code.
location_code is a location code indicating a region in which the output process is to be performed in accordance with the emergency alert information serving as the process-related information associated with EA_code serving as the set process index constituting a set with location_code.

For the emergency alert process index information, a plurality of types of location_codes with different expression methods is prepared. A plurality of types of location_codes will be described later.

Here, hereinafter, a binary number is indicated by a numerical value to which b is appended to an end thereof.

FIG. 9 is a diagram for describing EA_status of FIG. 8.

In a case where EA_status is 0 (=00b), it indicates that the emergency alert is started. In a case where EA_status is 1 (=01b), it indicates that the emergency alert is continuing, and in a case where EA_status is 2 (=10b), it indicates that the emergency alert ends. EA_status having a value of 3 (=11b) is for future reservation (reserved).

FIG. 10 is a diagram for describing location_type of FIG. 8.

In a case where location_type is 0 (=000b), it indicates that an alert target is the whole country. In a case where location_type is 0, location_length and location_code are not arranged subsequently thereto (or ignored in the receiving device 12 although arranged).

In a case where location_type is 1 (=001b), it indicates that location_code expresses a region with a predetermined code, that is, for example, a prefectural code specified in JIS X0401. For example, a correspondence relation between the prefectural codes and the prefectures indicated by the prefectural codes can be preset in the receiving device 12.

Further, the prefectural codes specified in JIS X0401 are indicated by 8 bits. Therefore, in a case where location_type is 1, the size of location_code is fixed to 8 bits.

As described above, in a case where location_type is 1, the size of location_code uniquely becomes 8 bits and does not change, and thus it is unnecessary to arrange location_length indicating the size of location_code in the emergency alert process index information (FIG. 8).

In a case where location_type is 2 (=010b), it indicates that location_code expresses a region using a zip code.

The zip code is a 7-digit decimal number, and in a case where location_code expresses a region using the zip code, a value in which a decimal number serving as all or a part of the zip code is expressed by binary coded decimal (BCD) is set in location_code.

Here, according to BCD, each digit of the decimal number is indicated by 4 bits.

Further, when the region is expressed using all 7 digits of the zip code, the size of location_code is maximized.

Therefore, the maximum size of location_code expressing the region using the zip code is 28 bits (=7 digits×4 bits).

A maximum number of digits of a numerical value indicated by location_code expressing the region using the zip code is 7 digits of the zip code, and 3 bits which are a minimum number of bits that can express 7 which is the number of digits is allocated to location_length. 3-bit location_length is set to a value indicating the number of digits of the decimal number serving as all or a part of the zip code indicated by location_code.

In a case where location_type is 3 (=011b), it indicates that location_code expresses the region using a latitude and a longitude.

In this case, for example, latitudes and longitudes of two points are set in location_code, and location_code indicates a rectangular region having two points as a diagonal.

As the latitude and the longitude, for example, it is possible to employ a decimal number of a maximum of 9 digits with an integer part of 3 digits and a fraction part of 6 digits.

A numerical value indicating a decimal number serving as a latitude and a longitude by BCD is set in location_code.

Here, each of the latitude and the longitude is indicated by a decimal number of a maximum of 9 digits as described above, and thus a maximum size of location_code in which a numerical value indicated by BCD is set is 144 bits (=((9 digits×4 bits)+(9 digits×4 bits))×2 points).

Further, 4 bits which are a smallest number of bits which can indicate 9 which is a maximum number of a decimal digit serving as each of a latitude and a longitude is allocated to location_length. location_length of 4 bits is set to a value indicating a digit number of a decimal digit serving as each of a latitude and a longitude set in location_code.

location_type whose value is 4 (=100b) to 7 (=111b) is for future reservation (reserved).

FIG. 11 is a diagram illustrating a correspondence relation between the prefectural codes specified in JIS X0401 and the prefectures indicated by the prefectural codes.

It is possible to recognize the region (prefecture) indicated by the prefectural code in the receiving device 12 by presetting the correspondence relation between the prefectural codes and the prefectures illustrated in FIG. 11 in the receiving device 12.

Figure 12:
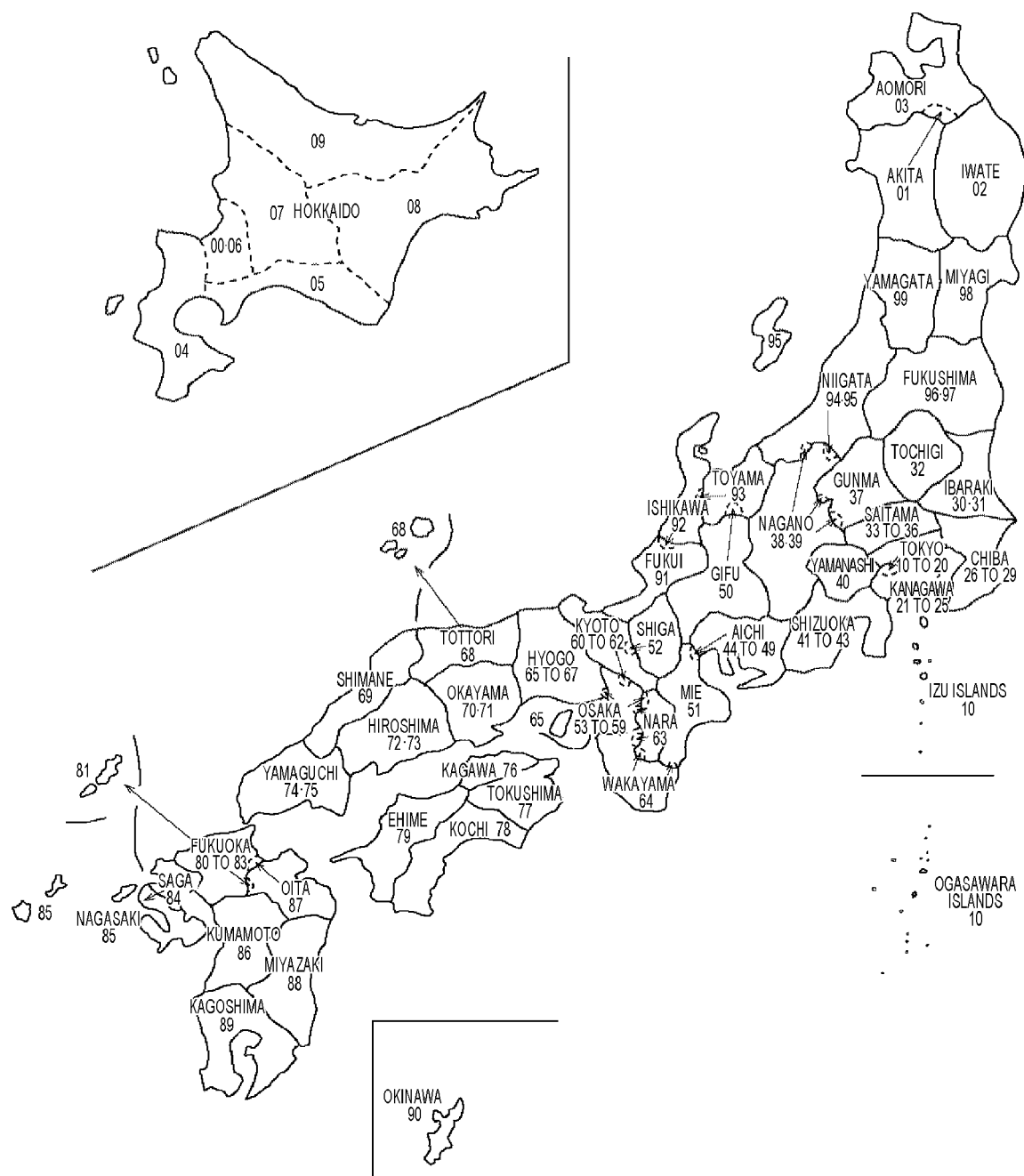
FIG. 12 is a diagram for describing expressions of regions using zip codes.

FIG. 12 is a diagram for describing an expression of regions using the zip codes.

The zip codes of 7 digits are set in a town area and a skyscraper.

Upper two digits of the zip codes of 7 digits indicate (almost) prefecture as illustrated in FIG. 12. Further, upper 3 digits or upper 5 digits in the zip code of 7 digits indicate a post office that manages it. Since the region managed by the post office is fixed, the upper 3 digits or the upper 5 digits in the zip code can be regarded as indicating the region managed by the post office indicated by the upper 3 digits or the upper 5 digits.

In a case where the upper 3 digits in the zip code indicate the post office that manages it, the remaining lower 4 digits indicate a town number of a town (or a skyscraper). Further, in a case where the upper 5 digits in the zip code indicate the post office that manages it, the remaining lower 2 bits indicate the town number.

For example, for the zip code of 7 digits, the zip code of 7 digits, upper 2 digits, upper 3 digits, or upper 5 digits can be used as location_code.

FIG. 13 is a diagram for describing an expression of regions using the latitude and the longitude.

In a case where the regions are expressed using the latitude and the longitude, the latitude and the longitude of the two points are set in location_code. location_code indicates a rectangular region having two points at which the latitude and the longitude are set in location_code as a diagonal.

As described above, as the location code location_code included in the emergency alert process index information, it is possible to use the prefectural code specified in JIS X0401, the zip code, the latitude and the longitude, or the like depending on location_type, and it is possible to designate a relatively large region such as a prefecture or a province, a relatively small region such as a municipality, or other regions having an arbitrary size can be designated if necessary.

FIG. 14 is a diagram illustrating an example of a syntax of the relevant table in which the process-related information related to the output process of outputting the emergency alert is registered.

In other words, FIG. 14 illustrates an example of a syntax of the relevant table used in a case where the process index information of FIG. 8 is used.

Here, hereinafter, the relevant table in which the process-related information related to the output process of outputting the emergency alert is registered is also referred to as an emergency alert table.

In FIG. 14, the emergency alert table has 8-bit table_id, 8-bit version, 8-bit length, and 8-bit NUM_EA_INFO.

Further, the emergency alert table has sets of 8-bit EA_code, 16-bit EA_message_length, and (8×EA_message_length)-bit EA_message_data which correspond in number to a number indicated by NUM_EA_INFO.

table_id indicates an ID (Identification) appended to the emergency alert table.

version indicates a version of the emergency alert table. version is incremented by 1 each time the emergency alert table is updated, for example.

length indicates a size (length) of the emergency alert table.

NUM_EA_INFO indicates the number of EA_codes serving as the process index arranged subsequently thereto.

Sets of EA_code, EA_message_length, and the emergency alert information which correspond in number to a number indicated by NUM_EA_INFO are repeatedly arranged after NUM_EA_INFO.

EA_message_length indicates a length of a character string (a length of the emergency alert information) serving as the emergency alert information arranged subsequently thereto.

EA_message_data indicates characters constituting the emergency alert information. A sequence of characters which correspond in number to the number indicated by EA_message_length and is indicated by EA_message_data is the emergency alert information serving as the process-related information related to the output process of outputting alert.

Hereinafter, the sequence of characters which correspond in number to the number indicated by EA_message_length and is indicated by EA_message_data is referred to as emergency alert information EA_message_data.

In the emergency alert table of FIG. 14, a disaster type code EA_code serving as the process index, EA_message_length, and the emergency alert information EA_message_data serving as the process-related information are registered in a for loop of a variable i (for (i=0; i<NUM_EA_INFO; i++)). In other words, in the emergency alert table, the emergency alert information EA_message_data serving as the process-related information is registered in association with the disaster type code EA_code serving as the process index.

Here, if the set of the disaster type code EA_code, EA_message_length, and the emergency alert information EA_message_data arranged in the for loop of the variable i is referred to as disaster type information, NUM_EA_INFO indicates the number of disaster type information registered in the emergency alert table.

FIG. 15 is a diagram illustrating an example of the emergency alert information EA_message_data serving as the process-related information.

In FIG. 15, the emergency alert information EA_message_data is a message indicating various types of alerts.

Each piece of emergency alert information EA_message_data is associated with the disaster type code EA_code of different value, for example, as illustrated in FIG. 15.

In the transmission process (FIG. 4) by the transmitting device 11 of FIG. 2, for example, transmission data in which the emergency alert table of FIG. 14 is included in the higher layer data, and the process index information of the emergency alert of FIG. 8 is included in the physical layer data is transmitted.

In this case, in the reception process (FIG. 6) by the receiving device 12 of FIG. 5, in a case where the receiving device 12 is powered on, the DEMUX 71 acquires the emergency alert table included in the higher layer data of the transmission data, and stores the emergency alert table in the storage unit 53.

Further, in the receiving device 12 of FIG. 5, the process index process is performed regardless of the power state.

Figure 16:
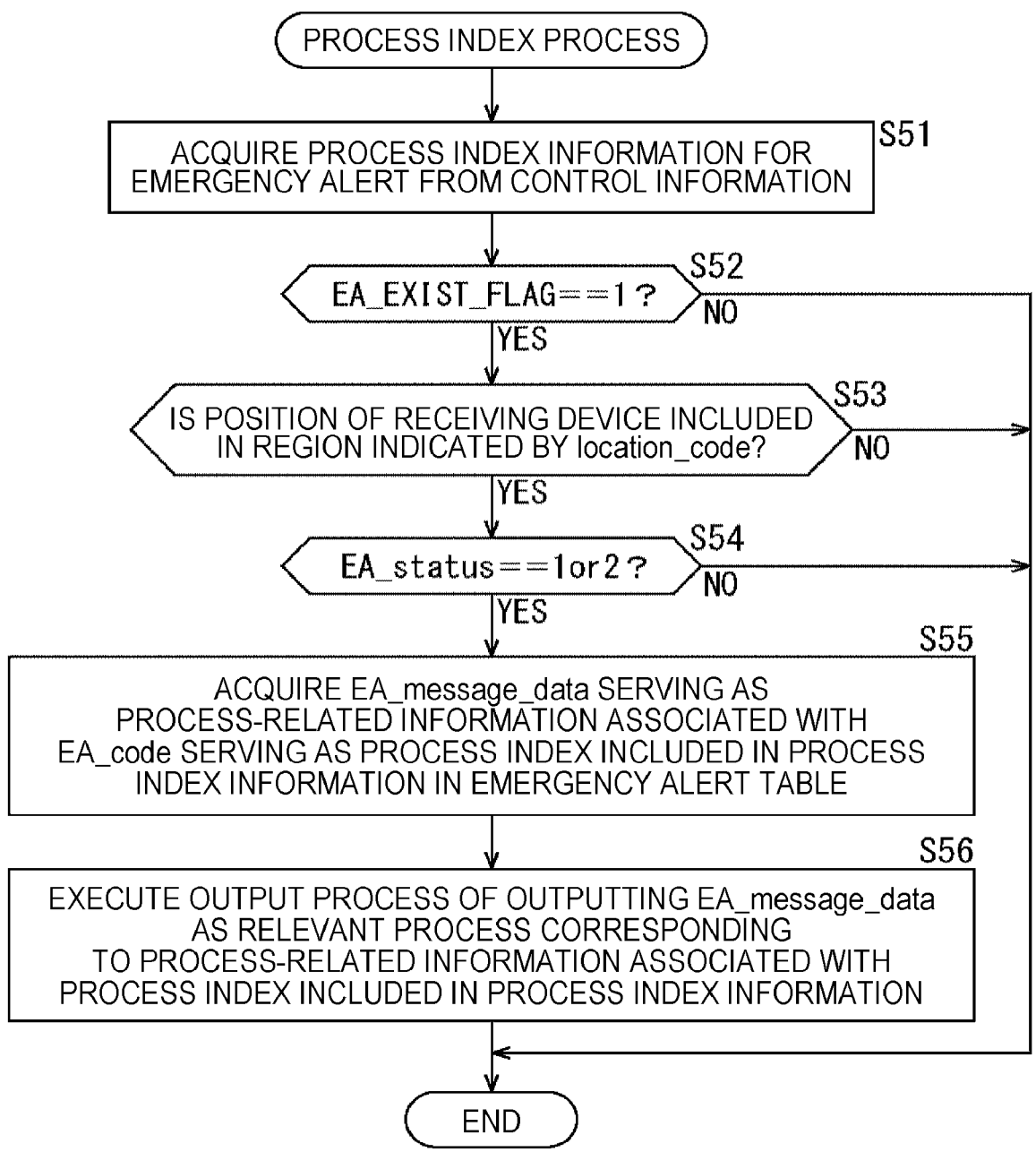
FIG. 16 is a flowchart illustrating an example of a process index process performed on process index information for emergency alert table and an emergency alert.

FIG. 16 is a flowchart illustrating an example of the process index process performed on the emergency alert table and the emergency alert process index information.

In other words, the flowchart in FIG. 16 illustrates an example of the process index process performed on the emergency alert table in FIG. 14 and the emergency alert process index information in FIG. 8 by the receiving device 12.

In the process index process, in step S51, the process index information acquiring unit 54 of the receiving device 12 (FIG. 5) acquires the emergency alert process index information included in the control information from the control information acquiring unit 65, and supplies the emergency alert process index information to the process executing unit 55, and the process proceeds to step S52. Here, step S51 corresponds to step S31 of FIG. 7.

In step S52, the process executing unit 55 of the receiving device 12 (FIG. 5) acquires EA_EXIST_FLAG included in the emergency alert process index information (FIG. 8) from the process index information acquiring unit 54. Further, in step S52, the process executing unit 55 determines whether or not EA_EXIST_FLAG acquired from the process index information is 1 indicating whether or not there is information subsequent to EA_EXIST_FLAG.

In a case where it is determined that EA_EXIST_FLAG is not 1 in step S52, that is, in a case where EA_EXIST_FLAG is 0, and there is no information subsequent thereto, the process index process ends.

Further, in a case where it is determined that EA_EXIST_FLAG is 1 in step S52, that is, in a case where there is information subsequent thereto, the process proceeds to step S53.

In step S53, the process executing unit 55 acquires all location_codes included in the emergency alert process index information (FIG. 8) from the process index information acquiring unit 54. Further, in step S53, the process executing unit 55 determines whether or not the receiving device position which is a current position of the receiving device 12 is included in a region indicated by any one location_code included in the emergency alert process index information.

Here, the process executing unit 55 recognizes the receiving device position by an arbitrary method. As a method of recognizing the receiving device position, for example, there is a method of receiving information necessary for recognizing the receiving device position such as the zip code of the region including the receiving device position at the time of an initial setting of the receiving device 12 and recognizing the receiving device position. Further, as a method of recognizing the receiving device position, for example, there is a method of installing a global navigation satellite system (GNSS) in the receiving device 12 and recognizing the receiving device position using the GNSS.

Further, the process executing unit 55 recognizes the region indicated by location_code included in the emergency alert process index information (FIG. 8) using location_type and location_length constituting a set with location_code if necessary.

In a case where it is determined in step S53 that the receiving device position is not included in the region indicated by any location_code, that is, in a case where the receiving device position is not included in the region of the emergency alert target, the process index process ends.

Further, in a case where it is determined in step S53 that the receiving device position is included in the region indicated by any one location_code, that is, in a case where the receiving device position is included in the region of the emergency alert target, the process executing unit 55 specifies (stores) location_code indicating the region including the receiving device position as a location code of interest location_code, and the process proceeds to step S54.

In step S54, the process executing unit 55 obtains EA_status constituting a set with the location code of interest location_code from the process index information (FIG. 8). Further, in step S54, the process executing unit 55 determines whether or not or not EA_status (FIG. 9) constituting a set with the location_code of interest location_code is 1 or 2 indicating a start or continuing of the emergency alert.

In a case where it is determined in step S54 that EA_status is neither 1 nor 2, that is, in a case where the emergency alert ends, the process index process ends.

Further, in a case where it is determined in step S54 that EA_status is either 1 or 2, that is, in a case where the emergency alert is started or is continuing, the process proceeds to step S55.

In step S55, the process executing unit 55 acquires the disaster type code EA_code serving as the process index constituting a set with the location code of interest location_code from the process index information (FIG. 8) as a disaster type code of interest EA_code.

Further, in step S55, the process executing unit 55 acquires the emergency alert information EA_message_data serving as the process-related information associated with (the disaster type code EA_code coinciding with) the disaster type code of interest EA_code serving as the process index in the emergency alert table (FIG. 14) stored in the storage unit 53 as information of interest. Here, step S55 corresponds to step S32 of FIG. 7.

Thereafter, the process proceeds from step S55 to step S56, the process executing unit 55 executes the output process of outputting the emergency alert information EA_message_data serving as the information of interest as the relevant process corresponding to the process-related information acquired as the information of interest, and the process index process ends.

As the output process for outputting the emergency alert information EA_message_data serving as the information of interest, for example, a message display processing of causing the output device 13 to display the emergency alert information EA_message_data serving as the information of interest or a sound message output process of causing the output device 13 to output a sound is performed.

Here, step S56 corresponds to step S33 of FIG. 7.

FIG. 17 is a diagram illustrating another example of the syntax of the emergency alert process index information.

The emergency alert process index information of FIG. 17 has EA_EXIST_FLAG, version, NUM_EA_MESSAGE, EA_code, and EA_status.

Therefore, the emergency alert process index information of FIG. 17 is similar to that of FIG. 8 in that it has EA_EXIST_FLAG, version, NUM_EA_MESSAGE, EA_code, and EA_status.

However, the emergency alert process index information in FIG. 17 differs from that of FIG. 8 having the set of location_type, location_length, and location_code in that it does not have region information indicating the region in which the output process is to be performed, that is, the set of location_type, location_length, and location_code.

FIG. 18 is a diagram illustrating another example of the syntax of the emergency alert table serving as the relevant table.

In other words, FIG. 18 illustrates an example of the syntax of the emergency alert table used in a case where the process index information of FIG. 17 is used.

The emergency alert table of FIG. 18 has table_id, version, length, NUM_EA_INFO, EA_code, location_type, location_length, location_code, EA_message_length, and EA_message_data.

Therefore, the emergency alert table of FIG. 18 is similar to that of FIG. 14 in that it has table_id, version, length, NUM_EA_INFO, EA_message_length, and EA_message_data.

However, the emergency alert table in FIG. 18 differs from that of FIG. 14 having no set of location_type, location_length, and location_code in that a set of location_type, location_length, and location_code which are region information indicating the region in which the output process is to be performed.

In other words, in the emergency alert table of FIG. 18, the emergency alert information EA_message_data serving as the process-related information and the region information including the location code location_code indicating the region in which the output process is to be performed in accordance with the emergency alert information EA_message_data are registered in association with the disaster type code EA_code as the process index.

In a case where the emergency alert process index information of FIG. 17 and the emergency alert table of FIG. 18 are used, for example, in the transmission process (FIG. 4) by the transmitting device 11 of FIG. 2, for example, the transmission data in which the emergency alert table in FIG. 18 is included in the higher layer data, and the emergency alert process index information of FIG. 17 is included in the physical layer data is transmitted.

In this case, in the reception process (FIG. 6) by the receiving device 12 of FIG. 5, in a case where the receiving device 12 is powered on, the DEMUX 71 acquires the emergency alert table included in the higher layer data of the transmission data, and stores the emergency alert table in the storage unit 53.

Further, in the receiving device 12 of FIG. 5, the process index process is performed regardless of the power state.

Figure 19:
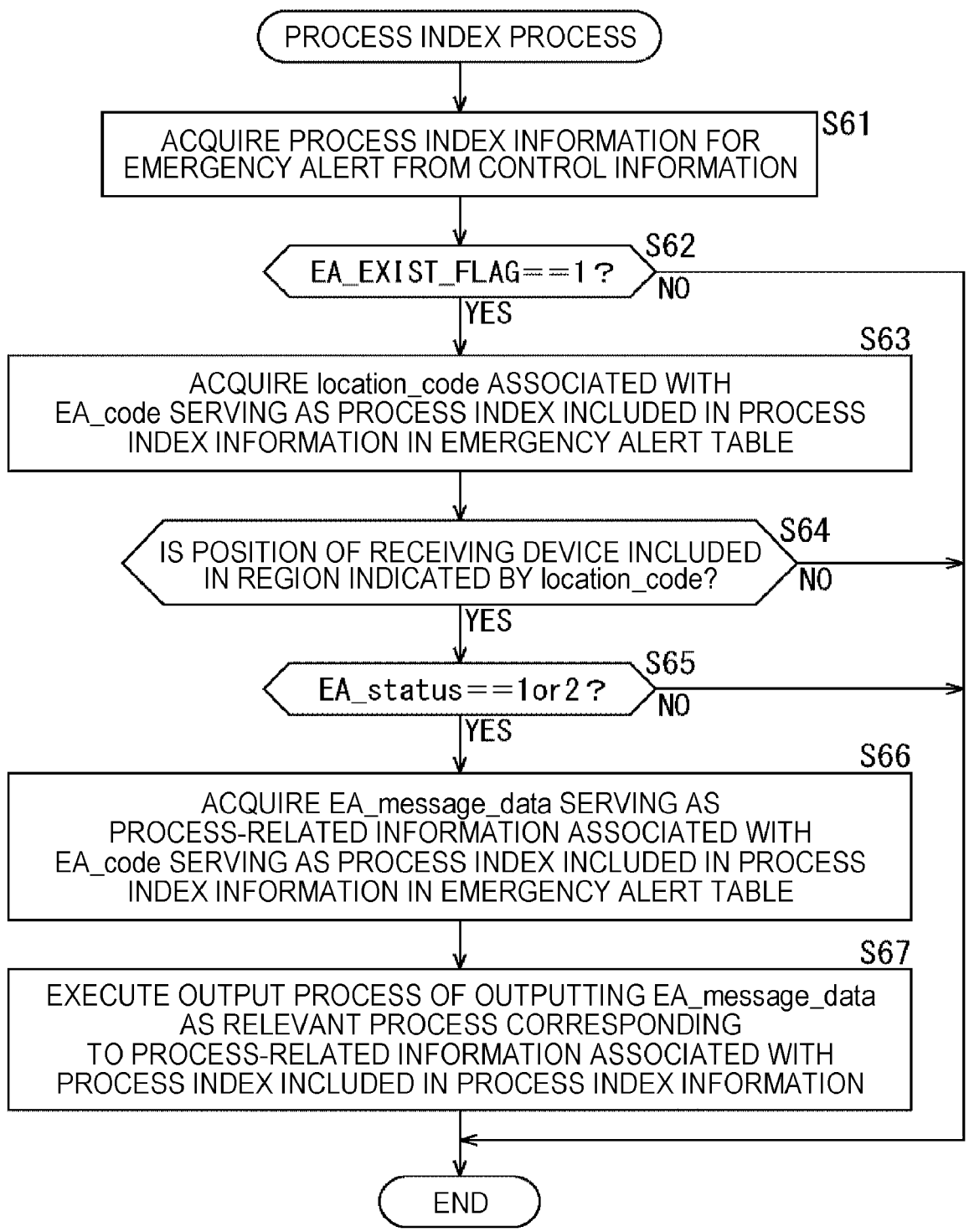
FIG. 19 is a flowchart illustrating another example of a process index process performed on an emergency alert table and process index information for an emergency alert.

FIG. 19 is a flowchart illustrating another example of the process index process performed on the emergency alert table and the emergency alert process index information.

In other words, the flowchart of FIG. 19 illustrates an example of the process index process performed on the emergency alert table of FIG. 18 and the process index information of the emergency alert of FIG. 17 by the receiving device 12.

In the process index process, in step S61, similarly to step S51 of FIG. 16, the process index information acquiring unit 54 of the receiving device 12 (FIG. 5) acquires the emergency alert process index information included in the control information from the control information acquiring unit 65, and supplies the emergency alert process index information to the process executing unit 55, and the process proceeds to step S62. Here, step S61 corresponds to step S31 of FIG. 7.

In step S62, the process executing unit 55 of the receiving device 12 (FIG. 5) acquires EA_EXIST_FLAG included in the emergency alert process index information (FIG. 17) from the process index information acquiring unit 54. Further, in step S62, similarly to step S52 in FIG. 16, the process executing unit 55 determines whether or not EA_EXIST_FLAG acquired from the process index information is 1 indicating whether or not there is information subsequent to EA_EXIST_FLAG.

In a case where it is determined in step S62 that EA_EXIST_FLAG is not 1, that is, in a case where EA_EXIST_FLAG is 0, and there is no information subsequent thereto, the process index process ends.

Further, in a case where it is determined in in step S62 that EA_EXIST_FLAG is 1, that is, in a case where there is information subsequent thereto, the process proceeds to step S63.

In step S63, the process executing unit 55 acquires all the disaster type codes EA_code included in the emergency alert process index information (FIG. 17) from the process index information acquiring unit 54. Further, in step S63, the process executing unit 55 acquires all location_codes (hereinafter, also referred to as a registered location code location_code) associated with the disaster type code EA_code acquired from the emergency alert process index information in the emergency alert table (FIG. 18), and the process proceeds to step S64.

In step S64, the process executing unit 55 determines whether or not the receiving device position of the receiving device 12 is included in the region indicated by any registered location code location_code acquired in step S63.

In a case where it is determined in step S64 that the receiving device position is not included in the region indicated by any registered location code location_code, that is, in a case where the receiving device position is not included in the region of the emergency alert target, the process index process ends.

Further, in a case where it is determined in step S64 that the receiving device position is included in the region indicated by any registered location code location_code, that is, in a case where receiving device position is included in the region of the emergency alert target, the process executing unit 55 specifies (stores) the disaster type code EA_code associated with the registered location code location_code indicating the region including the receiving device position in the emergency alert table (FIG. 18) as the disaster type code of interest EA_code, and the process proceeds to step S65.

In step S65, the process executing unit 55 acquires EA_status constituting a set with the disaster type code of interest EA_code from the process index information (FIG. 17). Further, in step S65, the process executing unit 55 determines whether or not EA_status (FIG. 9) constituting a set with the disaster type code of interest EA_code is 1 or 2 indicating a start or continuing of the emergency alert.

In a case where it is determined in step S65 that EA_status is neither 1 nor 2, that is, in a case where the emergency alert ends, the process index process ends.

Further, in a case where it is determined in step S65 that EA_status is either 1 or 2, that is, in a case where the emergency alert is started or continuing, the process proceeds to step S66.

In step S66, the process executing unit 55 acquires the emergency alert information EA_message_data serving as the process-related information associated with (the disaster type code EA_code coinciding with) the disaster type code of interest EA_code serving as the process index in the emergency alert table (FIG. 18) stored in the storage unit 53 as the information of interest. Here, step S66 corresponds to step S32 of FIG. 7.

Thereafter, the process proceeds from step S66 to step S67, and similarly to step S56 of FIG. 16, the process executing unit 55 executes the output process of outputting the emergency alert information EA_message_data serving as the information of interest as the relevant process corresponding to the process-related information acquired as the information of interest, and the process index process ends. Here, step S67 corresponds to step S33 of FIG. 7.

In the emergency alert method using the emergency alert table and the emergency alert process index information, the transmitting device 11 transmits the transmission data in which the emergency alert table is included in the higher layer data, and the emergency alert process index information is included in the physical layer data, and the receiving device 12 acquires the emergency alert table included in the higher layer data of the transmission data and executes the output process of outputting the emergency alert information EA_message_data associated with the process index included in the physical layer data of the transmission data in the emergency alert table, and thus according to the emergency alert method of performing the emergency alert, the emergency alert table in which the emergency alert information EA_message_data associated with the disaster type code EA_code serving as the process index is registered is included in the higher layer data and supplied, so that the flexibility and the extendibility of the emergency alert can be improved, and the disaster type code EA_code serving as the process index is included in the physical layer data and supplied, so that the immediacy can be improved.

Further, the emergency alert method using the emergency alert table and the emergency alert process index information can be applied to, for example, ISDB-T, digital video broadcasting (DVB), advanced television systems committee (ATSC), and any other broadcasting scheme.

For example, in ATSC 3.0, emergency alert signing is specified in Annex G.

Figure 20:
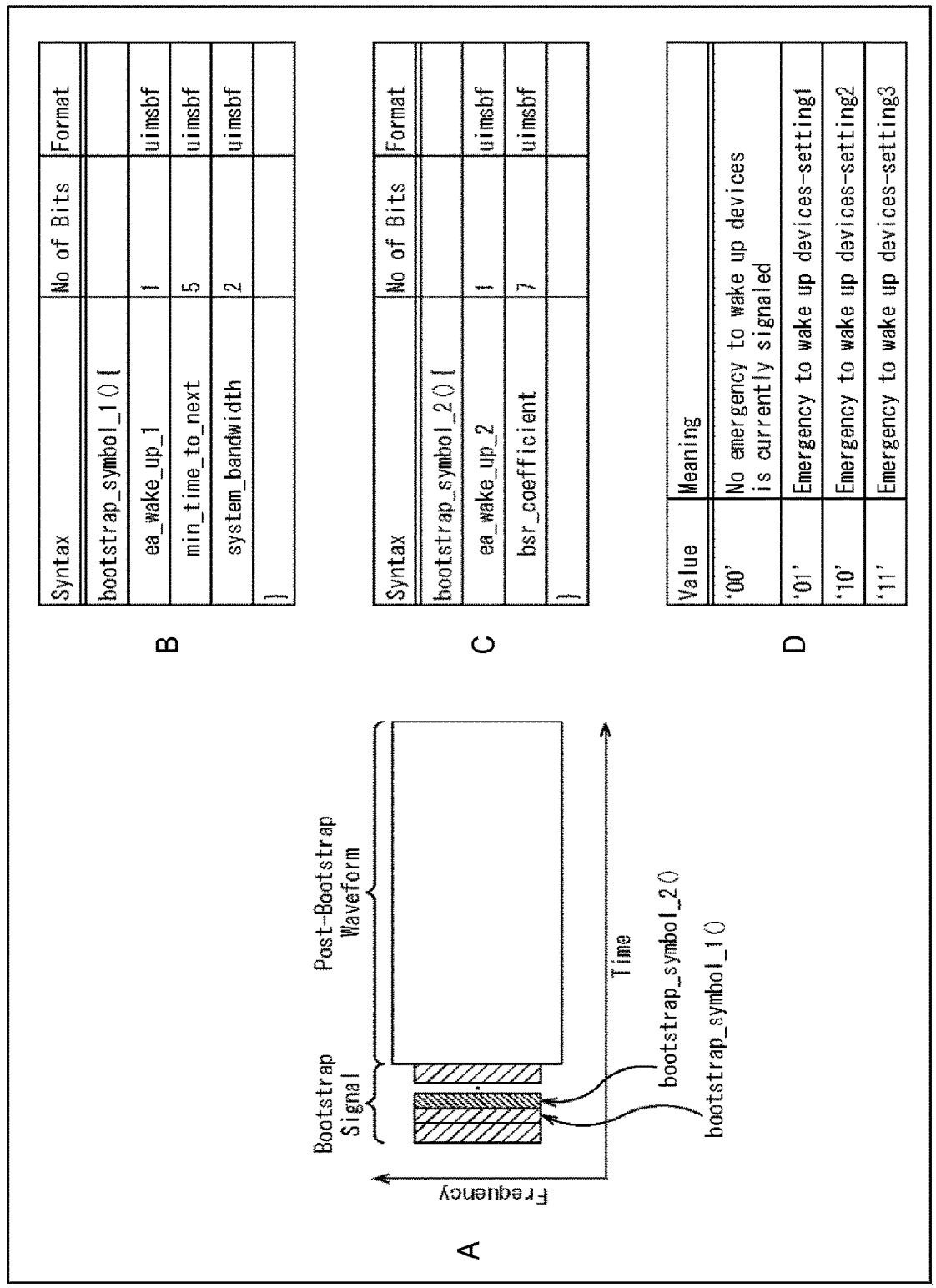
FIG. 20 is a diagram for describing emergency alert signaling specified by ATSC 3.0.

FIG. 20 is a diagram for describing the emergency alert signaling specified in ATSC 3.0.

A of FIG. 20 illustrates a structure of a general physical layer frame and a boot slap in ATSC 3.0.

In A of FIG. 20, a bootstrap (bootstrap signal) has a plurality of bootstrap symbols, and BootStrap_symbol_1( ) and BootStrap_symbol_2( ) are defined in the plurality of boot slap symbols.

B of FIG. 20 illustrates a syntax of BootStrap_symbol_1( ), and C of FIG. 20 illustrates a syntax of BootStrap_symbol_2( ).

BootStrap_symbol_1( ) includes 1-bit ea_wake_up_1, and BootStrap_symbol_2( ) includes 1-bit ea_wake_up_2.

The two bits of ea_wake_up_1 and ea_wake_up_2 are defined in Annex G of A/331 as wake-up bits.

D of FIG. 20 illustrates definitions of the wake-up bits.

Referring to D of FIG. 20, activating the receiving devices at settings 1, 2, and 3 are defined in association with the wake-up bits as processes at the time of emergency.

The emergency alert method using the emergency alert table and the emergency alert process index information can be applied to the emergency alert signaling of ATSC 3.0 described above.

In other words, for example, the emergency alert table in which the wake-up bit is used as the process index, and the process-related information is registered in association with the wake-up bit serving as the process index is included in the higher layer data and supplied, and thus the process with high immediacy and flexibility can be performed as the output process of outputting the emergency alert in ATSC.

Example of Relevant Table in which Process-Related Information Related to Setting Process of Performing Channel Selection Setting is Registered and Process Index Information Including Process Index Associated with Process-Related Information FIG. 21 is a diagram illustrating an example of a syntax of the process index information including the process index associated with the process-related information related to a setting process for performing a channel selection setting.

Hereinafter, the process index information including the process index associated with the process-related information related to the setting process for performing the channel selection setting is also referred to as a channel selection setting process index information.

In FIG. 21, the channel selection setting process index information has 1-bit location_exist_flag. Further, the channel selection setting process index information has 8-bit location_code if necessary.

location_exist_flag is a flag indicating whether or not there is information subsequent to location_exist_flag in the channel selection setting process index information.

In a case where location_exist_flag indicates that there is information subsequent thereto, location_code is arranged subsequently to location_exist_flag.

For example, location_code is a location code indicating a region, similarly to the case of the emergency alert process index information of FIG. 8. Here, in the channel selection setting process index information, the location code location_code serves as a process index associated with channel selection information necessary (useful) for the channel selection setting serving as the process-related information related to the setting process of performing the channel selection setting.

Further, in the channel selection setting process index information, the location code location_code is fixed to a predetermined type of code, that is, for example, the prefectural code specified in JIS X0401 illustrated in FIG. 12. Therefore, location_type and location_length are not arranged (unnecessary) in the channel selection setting process index information unlike the emergency alert process index information.

A value indicating the region in a reception area in which the transmission data transmitted by the transmitting device 11 can be received is set in the location code location_code serving as the process index included in the channel selection setting process index information.

FIG. 22 is a diagram illustrating an example of a syntax of the relevant table in which the channel selection information serving as the process-related information related to the setting process of performing the channel selection setting is registered.

In other words, FIG. 22 illustrates an example of the syntax of the relevant table used in a case where the process index information of FIG. 21 is used.

Here, hereinafter, the relevant table in which the process-related information related to the setting process of performing the channel selection setting is registered is also referred to as a channel selection information table.

In FIG. 22, the channel selection information table has 8-bit table_id, 8-bit length, and 8-bit NUM_TUNE_INFO.

Further, the channel selection information table has sets of 8-bit location code location_code, 6-bit channel, 3-bit protocol, 3-bit packet_type, 2-bit layer_fft_size, 3-bit layer_mod, 3-bit layer_cod, 3-bit layer_gi, 8-bit message_length, and (8× message_length)-bit message_data which correspond in number to a number indicated by NUM_TUNE_INFO.

In FIG. 22, channel, protocol, packet_type, layer_fft_size, layer_mod, layer_cod, layer_gi, and message_data are the channel selection information.

table_id indicates an ID (Identification) appended to the channel selection information table.

length indicates a size (length) of the channel selection information table.

NUM_TUNE_INFO indicates the number of location codes location_code serving as the process index arranged subsequently thereto.

Here, in the channel selection information table, the channel selection information (channel, protocol, packet_type, layer_fft_size, layer_mod, layer_cod, layer_gi, and message_data) serving as process-related information is registered in association with the location code location_code serving as the process index. Therefore, NUM_TUNE_INFO indicates the number of channel selection information registered in the channel selection information table in addition to the number of location codes location_code registered in the channel selection information table.

Sets of the location code location_code, the channel selection information, and message_length which correspond in number to the number indicated by NUM_TUNE_INFO are repeatedly arranged after NUM_TUNE_INFO.

The channel in the channel selection information indicates a frequency of channel or a channel number which is receivable in the region indicated by location code location_code constituting a set with the channel. Here, for example, in ISDB-T, there are 40 channels having channel numbers 13 to 52 in a UHF band, and a (center) frequency of each channel is uniquely associated with a channel number. Therefore, in ISDB-T, the frequency of the channel and the channel number are equivalent information.

The protocol in the channel selection information indicates a protocol (broadcasting scheme) of transmission data transmitted through a channel (channel number) indicated by a channel constituting a set with the protocol.

packet_type in the channel selection information indicates a packet type of a packet constituting higher layer data of transmission data transmitted through a channel indicated by a channel constituting a set with packet_type.

layer_fft_size in the channel selection information indicates a FFT size when FFT is performed on an OFDM signal serving as transmission data transmitted on a channel indicated by a channel constituting a set with layer_fft_size.

layer_mod in the channel selection information indicates a sub carrier modulation scheme of an OFDM signal serving as transmission data transmitted on a channel indicated by a channel constituting a set with layer_mod.

layer_cod in the channel selection information indicates a code rate of an error correction code (FEC) used for error correction coding performed by transmission path encoding when transmission data transmitted on a channel indicated by a channel constituting a set with layer_cod.

layer_gi in the channel selection information indicates a length of a GI (GI length) added to an OFDM signal serving as transmission data transmitted on a channel indicated by a channel constituting a set with layer_gi.

message_data in the channel selection information indicates characters constituting a message (hereinafter also referred to as a channel message) related to a channel indicated by a channel constituting a set with message_data. In the channel selection information, a sequence of characters indicated by message_data which correspond in number to the number indicated by message_length is the channel message of the channel indicated by the channel included in the channel selection information.

Hereinafter, the sequence of characters indicated by message_data which correspond in number to the number indicated by message_length is also referred to as a channel message message_data.

message_length indicates a length of the character string serving as message_data arranged subsequently thereto (a length of the channel message).

In the channel selection information table of FIG. 22, a location code location_code serving as the process index, message_length, and the channel selection information serving as the process-related information (channel, protocol, packet_type, layer_fft_size, layer_mod, layer_cod, layer_gi, and message_data) are registered in a for loop of a variable i (for (i=0; i<NUM_TUNE_INFO; i++)). In other words, in the channel selection information table, the channel selection information serving as the process-related information is registered in association with the location code location_code serving as the process index.

FIG. 23 is a diagram illustrating an example of a relation between the channel number and the (center) frequency of the channel.

Here, the channel number and the frequency are associated for the channel, for example, as illustrated in FIG. 23. In a case where the channel number and the frequency are associated with each other, the channel number or the frequency can be set in the channel serving as the channel selection information in the channel selection information table (FIG. 22) as information specifying the channel.

FIG. 24 is a diagram for describing an example of the protocol serving as the channel selection information of the channel selection information table (FIG. 22).

In FIG. 24, in a case where the protocol is 0 (=000b), it indicates that the broadcasting scheme of the transmission data is the ISDB-T scheme. In a case where the protocol is 1 (=001b), it indicates that the broadcasting scheme of the transmission data is a next-generation scheme of the ISDB-T scheme (an ISDB-T2 scheme in FIG. 24).

Protocols with values of 2 (=010b) to 7 (=111b) are for future reservation (reserved).

FIG. 25 is a diagram for describing an example of packet_type serving as the channel selection information of the channel selection information table (FIG. 22).

In FIG. 25, in a case where packet_type is 0 (=000b), it indicates that the higher layer data of the transmission data is MPEG2-TS. In a case where packet_type is 1 (=001b), it indicates that higher layer data of the transmission data is TLV/MMV.

packet_type with values of 2 (=010b) to 7 (=111b) are for future reservation (reserved).

FIG. 26 is a diagram for describing an example of layer_fft_size serving as the channel selection information of the channel selection information table (FIG. 22).

In FIG. 26, in a case where layer_fft_size is 0 (=00b) to 2 (=10b), it indicates that the FFT size is 8 K, 16 K, and 32 K, respectively. Further, 1 K means 1024 points.

layer_fft_size with a value of 3 (=11b) is for future reservation (reserved).

FIG. 27 is a diagram for describing an example of layer_mod serving as the channel selection information of the channel selection information table (FIG. 22).

FIG. 27 illustrates that the modulation scheme is QPSK, 16 QAM, 64 QAM, 256 QAM-non uniform constellation (NUC), 1024 QAM-NUC, 4096 QAM-NUC in a case where layer_mod is 0 (=000b) to 5 (=101b).

layer_mod with values of 6 (=110b) and 7 (=111b) are for future reservation (reserved).

FIG. 28 is a diagram for describing an example of layer_cod serving as the channel selection information of the channel selection information table (FIG. 22).

In FIG. 28, in a case where layer_cod is 0 (=000b) to 4 (=100b), it indicates that the code rate is ½, ⅔, ¾, ⅚, and ⅞.

layer_cod with values of 5 (=101b) to 7 (=111b) are for future reservation (reserved).

FIG. 29 is a diagram for describing an example of layer_gi serving as the channel selection information in the channel selection information table (FIG. 22).

In FIG. 29, in a case where layer_gi is 0 (=000b) to 3 (=011b), the GI length is ¼, ⅛, ⅟₁₆, and ⅟₃₂ of the symbol length (effective symbol length) of the OFDM symbol.

layer_gi with values of 4 (=100b) to 7 (=111b) are for future reservation (reserved).

FIG. 30 is a diagram illustrating an example of the location code location_code serving as the process index registered in the channel selection information table and the channel selection information (channel, protocol, packet_type, layer_fft_size, layer_mod, layer_cod, layer_gi, and message_data) associated with the location code location_code.

In FIG. 30, for example, the channel selection information of four channels (13, 0, 0, 0, 2, 2, 2, "Channel1"), (14, 0, 0, 0, 0, 0, 1, "Channel2"), (15, 1, 1, 2, 3, 3, 2, "Channel3"), and (16, 1, 1, 2, 3, 4, 3, "Channel4") are associated with the location code location_code=0 serving as the process index as the channel selection information (channel, protocol, packet_type, layer_fft_size, layer_mod, layer_cod, layer_gi, and message_data) for selecting a channel receivable in a region indicated by the location code location_code=0.

In the transmission process (FIG. 4) by the transmitting device 11 in FIG. 2, for example, the transmission data in which the channel selection information table of FIG. 22 is included in the higher layer data, and the channel selection setting process index information of FIG. 21 is included in the physical layer data is transmitted.

In this case, in the reception process (FIG. 6) by the receiving device 12 of FIG. 5, in a case where the receiving device 12 is powered on, the DEMUX 71 acquires the channel selection information table included in the higher layer data of the transmission data and stores the channel selection information in the storage unit 53.

Further, in the receiving device 12 of FIG. 5, the process index process is performed regardless of the power state.

Figure 31:
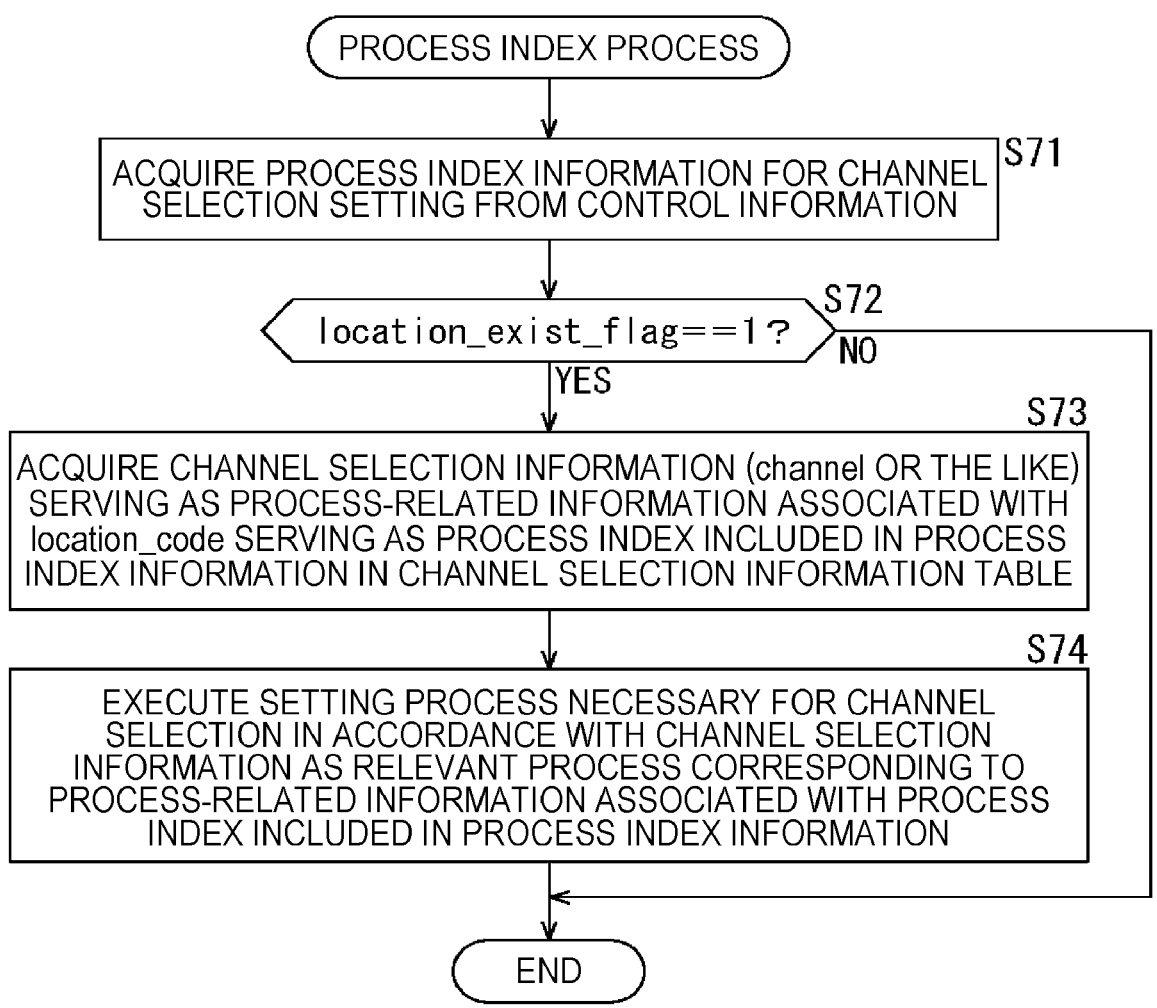
FIG. 31 is a flowchart for describing an example of a process index process performed on a channel selection information table and process index information for a channel selection setting.

FIG. 31 is a flowchart illustrating an example of a process index process performed on the channel selection information table and the channel selection setting process index information.

In other words, the flowchart of FIG. 31 illustrates an example of the process index process performed on the channel selection information table of FIG. 22 and the channel selection setting process index information of FIG. 21 by the receiving device 12.

In the process index process, in step S71, the process index information acquiring unit 54 of the receiving device 12 (FIG. 5) acquires the channel selection setting process index information included in the control information from the control information acquiring unit 65, and supplies the channel selection setting process index information to the process executing unit 55, and the process proceeds to step S72. Here, step S71 corresponds to step S31 of FIG. 7.

In step S72, the process executing unit 55 of the receiving device 12 (FIG. 5) acquires location_exist_flag included in the channel selection setting process index information (FIG. 21) from the process index information acquiring unit 54. Further, in step S72, the process executing unit 55 determines whether or not location_exist_flag acquired from the process index information is 1 indicating whether or not or not there is information subsequent to location_exist_flag.

In a case where it is determined in step S72 that location_exist_flag is not 1, that is, in a case where location_exist_flag is 0, and there is no information subsequent thereto, the process index process ends.

Further, in a case where it is determined in step S72 that location_exist_flag is 1, that is, in a case where there is a location code location_code serving as the process index which is information subsequent thereto, the process proceeds to step S73.

In step S73, the process executing unit 55 acquires all the location codes location_code serving as the process index included in the process index information as a location code of interest location_code.

Further, in step S73, the process executing unit 55 acquires all the channel selection information serving as process-related information (channel, protocol, packet_type, layer_fft_size, layer_mod, layer_cod, layer_gi, and message_data) associated with (the location code location_code coinciding with) the location code of interest location_code serving as the process index in the channel selection information table (FIG. 22) stored in the storage unit 53 by the reception process as the information of interest. Here, step S73 corresponds to step S32 of FIG. 7.

Thereafter, the process proceeds from step S73 to step S74, and the process executing unit 55 executes the setting process of performing the channel selection setting in accordance with the channel selection information (channel, protocol, packet_type, layer_fft_size, layer_mod, layer_cod, layer_gi, and message_data) serving as the information of interest as the relevant process corresponding to the process-related information acquired as the information of interest, and the process index process ends. Here, step S74 corresponds to step S33 of FIG. 7.

As described above, in the channel selection setting method using the channel selection information table and the channel selection setting process index information, the transmitting device 11 transmits the transmission data in which the channel selection information table is included in the higher layer data, and the channel selection setting process index information is included in the physical layer data, and the receiving device 12 acquires the channel selection information table included in the higher layer data of the transmission data, and executes the setting process in accordance with the channel selection information associated with the process index included in the physical layer data of the transmission data in the channel selection information table, and thus according to the channel selection setting scheme of performing the channel selection setting, the receiving device 12 receives the location code location_code serving as the process index which is included in the physical layer data and supplied after the channel selection information table which is included in the higher layer data and supplied, and performs the channel selection setting process for the channel receivable at the position of the receiving device 12, so that the channel selection setting can be easily performed.

Further, in a case where the receiving device 12 moves, the channel selection setting process is performed for the channels receivable at the position of the destination of the receiving device 12, and thus it is possible to prevent the program viewing from being interrupted for a long time since receivable channels are scanned at the moving destination of the receiving device 12.

Further, for example, in a case where a transmission parameter of a broadcast on a channel receivable at the position of the receiving device 12 is updated (changed), the receiving device 12 can acquires and update the channel selection information table in which the updated transmission parameter is reflected and deal with it easily.

Further, in the present embodiment, the OFDM signal is employed as the transmission data to be transmitted from the transmitting device 11 to the receiving device 12, but in addition, for example, a frequency division multiplexing (FDM) signal or a time division multiplexing (TDM) signal other than the OFDM can be employed.

Figure 32:
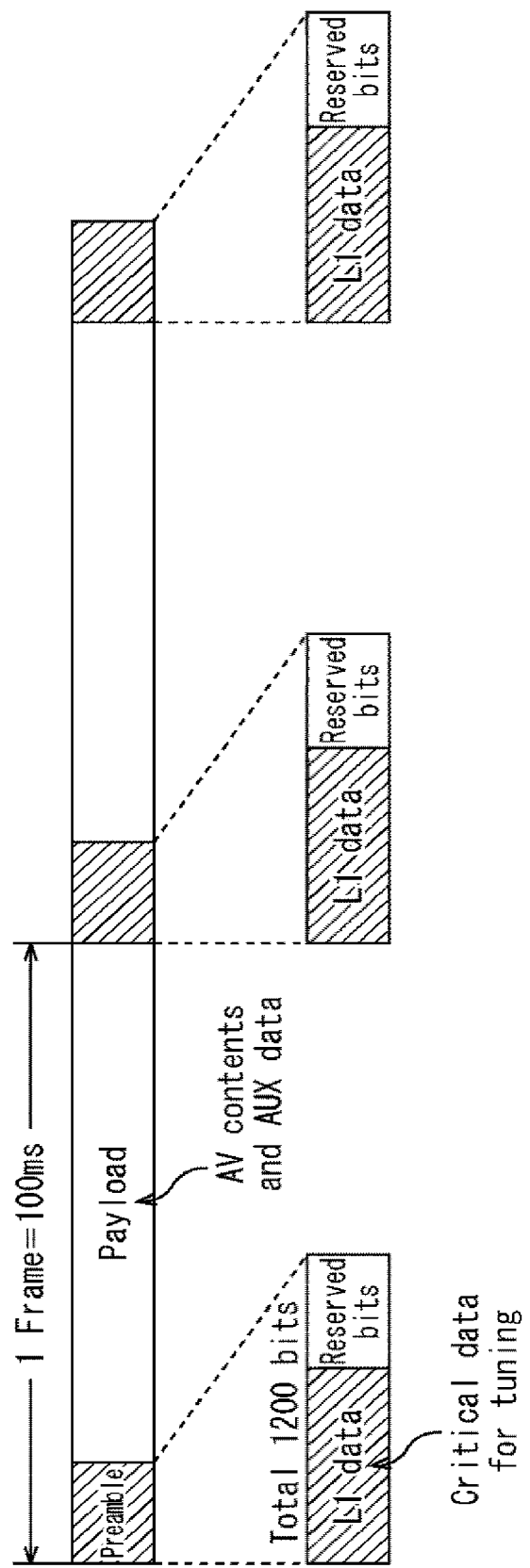
FIG. 32 is a diagram illustrating an example of a format of a signal of TDM.

FIG. 32 is a diagram illustrating an example of a TDM signal format.

In FIG. 32, the TDM signal is configured with frames in which a preamble and a payload are arranged in order.

In FIG. 32, the preamble is configured with 1,200 bits, some bits are allocated to L1 data, and the remaining bits are reserved bits to be used in the future.

Data (AV contents) such as an image or a sound is arranged in the payload.

The preamble is the physical layer data, and data arranged in the payload is the higher layer data.

In a case where the TDM signal is employed as the transmission data, the process index information can be included in the reserved bit of the preamble which is the physical layer data and supplied, and the relevant table can be included in the payload which is the higher layer data and supplied.

<Description of Computer to which Present Technology is Applied>

Next, at least apart of a series of processes described above can be performed by hardware or software. In a case where a series of processes is performed by software, a program constituting the software is installed in a general-purpose computer or the like.

FIG. 33 is a block diagram illustrating a configuration example of one embodiment of a computer in which a program for executing a series of processes described above is installed.

The program can be recorded in a hard disk 105 or a ROM 103 serving as a recording medium installed in a computer in advance.

Alternatively, the program can be stored (recorded) in a removable recording medium 111. The removable recording medium 111 can be provided as a so-called package software. Here, examples of the removable recording medium 111 include a flexible disk, a compact disc read only memory (CD-ROM), a magneto optical (MO) disk, a digital versatile disc (DVD), a magnetic disk, a semiconductor memory, and the like.

Further, the program is installed from the removable recording medium 111 to the computer, but the program can be downloaded to the computer via a communication network or a broadcasting network and installed in an internal hard disk 105. In other words, the program can be wirelessly transferred from a download site to the computer via an artificial satellite for digital satellite broadcasting or can be transferred to a computer via a network such as a local area network (LAN) or the Internet in a wired manner, for example.

The computer includes an internal central processing unit (CPU) 102, and an input/output interface 110 is connected to the CPU 102 via a bus 101.

For example, if a command is input as a user manipulates an input unit 107 through the input/output interface 110, the CPU 102 executes the program stored in a Read Only Memory (ROM) 103 in accordance with the command. Alternatively, the CPU 102 loads the program stored in the hard disk 105 onto a random access memory (RAM) 104 and executes the program.

Accordingly, the CPU 102 performs the process according to the flow chart described above or the process performed by the configuration of the block diagram described above. Then, for example, the CPU 102 causes a processing result to be output from an output unit 106, transmitted from a communication unit 108, or furthermore stored in the hard disk 105, for example, via the input/output interface 110 if necessary.

Further, the input unit 107 includes a keyboard, a mouse, a microphone, or the like. Further, the output unit 106 includes a liquid crystal display (LCD), a speaker, or the like.

Here, in this specification, the processes which the computer performs in accordance with the program need not be necessarily performed chronologically in accordance with the order described as the flowchart. In other words, the processes which the computer performs in accordance with the program include processes which are executed in parallel or individually as well (for example, a parallel process or an object-based process).

Further, the program may be processed by a single computer (processor) or may be shared and processed by a plurality of computers.

Further, in this specification, a system means a set of a plurality of components (apparatuses, modules (parts), or the like), and it does not matter whether or not all the components are in a single housing. Therefore, a plurality of apparatuses which are accommodated in separate housings and connected via a network and a single apparatus in which a plurality of modules is accommodated in a single housing are both systems.

Incidentally, the embodiment of the present technology is not limited to the above-described embodiment, and various modifications can be made without departing from the gist of the present technology.

Further, the respective steps described in the flowchart described above can be executed by a single apparatus or can be shared and executed by a plurality of apparatuses.

Further, in a case where a plurality of processes is included in one step, the plurality of processes included in one step can be executed by a single apparatus or shared and executed by a plurality of apparatuses.

Further, the effects described in this specification are merely examples and not limited, and other effects may be included.

Incidentally, the present technology can have the following configurations.

<1>

A transmitting device, including:

a generating unit configured to generate transmission data in which an index associated with predetermined process-related information in a relevant table in which process-related information related to an output process of outputting an alert on a receiving side is registered in association with an index is included in data of a physical layer, the relevant table being included in data of a higher layer higher than the physical layer and supplied; and a transmitting unit configured to transmit the transmission data.

<2>

The transmitting device according to <1>, in which the generating unit generates transmission data in which the index and a location code indicating a region in which the output process corresponding to the process-related information associated with the index is to be performed are included in the data of the physical layer.

<3>

The transmitting device according to <1>, in which, in the relevant table, the process-related information and a location code indicating a region in which the output process corresponding to the process-related information is to be performed are associated with the index.

<4>

The transmitting device according to any of <1> to <3>, in which the generating unit generates transmission data in which the relevant table is included in the data of the higher layer, and the index is included in the data of the physical layer.

<5>

The transmitting device according to any of <1> to <3>, in which the relevant table is supplied from a server to the receiving side.

<6>

The transmitting device according to any of <1> to <5>, in which the transmitting unit transmits the transmission data of FDM or TDM.

<7>

A transmitting method, including:

generating transmission data in which an index associated with predetermined process-related information in a relevant table in which process-related information related to an output process of outputting an alert on a receiving side is registered in association with an index is included in data of a physical layer, the relevant table being included in data of a higher layer higher than the physical layer and supplied; and transmitting the transmission data.

<8>

A receiving device, including:

a relevant table acquiring unit configured to acquire a relevant table in which process-related information related to an output process of outputting an alert on a receiving side is registered in association with an index, the relevant table being included in data of a higher layer higher than a physical layer and supplied; and a receiving unit configured to receive transmission data in which an index associated with predetermined process-related information in the relevant table is included in data of the physical layer;

an index acquiring unit configured to acquire the index included in the data of the physical layer from the transmission data; and a process executing unit configured to execute the output process corresponding to the process-related information associated with the index included in the data of the physical layer in the relevant table.

<9>

The receiving device according to <8>, in which, in the transmission data, the index and a location code indicating a region in which the output process corresponding to the process-related information associated with the index is to be performed are included in the data of the physical layer, the index acquiring unit acquires the index and the location code included in the data of the physical layer, and in a case where the receiving device is located in the region indicated by the location code included in the data of the physical layer, the process executing unit executes the output process corresponding to the process-related information associated with the index included in the data of the physical layer in the relevant table.

<10>

The receiving device according to <8>, in which, in the relevant table, the process-related information and a location code indicating a region in which the output process corresponding to the process-related information is to be performed are associated with the index, and in a case where the receiving device is located in the region indicated by the location code associated with the index included in the data of the physical layer in the relevant table, the process executing unit executes the output process corresponding to the process-related information associated with the index included in the data of the physical layer in the relevant table.

<11>

The receiving device according to any of <8> to <10>, in which, in the transmission data, the relevant table is included in the data of the higher layer, and the index is included in the data of the physical layer, and the relevant table acquiring unit acquires the relevant table included in the data of the higher layer from the transmission data.

<12>

The receiving device according to any of <8> to <10>, in which the relevant table acquiring unit acquires the relevant table from a server.

<13>

The receiving device according to any of <8> to <12>, in which the receiving unit receives the transmission data of FDM or TDM.

<14>

A receiving method, including:

acquiring a relevant table in which process-related information related to an output process of outputting an alert on a receiving side is registered in association with an index, the relevant table being included in data of a higher layer higher than a physical layer and supplied; and receiving transmission data in which an index associated with predetermined process-related information in the relevant table is included in data of the physical layer;

acquiring the index included in the data of the physical layer from the transmission data; and executing the output process corresponding to the process-related information associated with the index included in the data of the physical layer in the relevant table.

REFERENCE SIGNS LIST

11 Transmitting device
12 Receiving device
13 Output device
14 Server
21 Higher layer processing unit
22 Physical layer processing unit
31 Higher layer data generating unit
32 Relevant table generating unit
41 Control information generating unit
42 Transmission path encoding unit
43 IFFT calculating unit
44 GI adding unit
45 Transmitting unit
51 Physical layer processing unit
52 Higher layer processing unit
53 Storage unit
54 Process index information acquiring unit
55 Process executing unit
61 Tuner
62 ADC
63 Quadrature demodulating unit 64 FFT calculating unit
65 Control information acquiring unit
66 Transmission path decoding unit
71 DEMUX
72 Higher layer data processing unit
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. A transmitting device, comprising:
processing circuitry configured to generate transmission data in which an index is included in data of a physical layer, the index associated with predetermined process-related information registered in a relevant table, the predetermined process-related information related to an output process of outputting an alert on a receiving side, the relevant table being included in data of a higher layer higher than the physical layer; and
transmission circuitry configured to transmit the transmission data over a television broadcast network,
wherein, in the relevant table, a location code indicating a region in which the output process corresponding to the predetermined process-related information is to be performed is associated with the index.

2. The transmitting device according to claim 1, wherein the location code is included in the data of the physical layer.

3. The transmitting device according to claim 1, wherein the relevant table is supplied from a server to the receiving side.

4. The transmitting device according to claim 1, wherein the transmission circuitry transmits the transmission data in accordance with frequency division multiplexing (FDM) or time division multiplexing (TDM).

5. A transmitting method, comprising:
generating, processing circuitry of a transmitting device, transmission data in which an index is included in data of a physical layer, the index associated with predetermined process-related information registered in a relevant table, predetermined process-related information related to an output process of outputting an alert on a receiving side, the relevant table being included in data of a higher layer higher than the physical layer; and
transmitting, by transmission circuitry of the transmitting device over a television broadcast network, the transmission data,
wherein, in the relevant table, a location code indicating a region in which the output process corresponding to the predetermined process-related information is to be performed is associated with the index.

6. A receiving device, comprising:
processing circuitry configured to acquire a relevant table in which predetermined process-related information is registered, the predetermined process-related information related to an output process of outputting an alert on a receiving side, the predetermined process-related information being associated with an index that is included in data of a physical layer, the relevant table being included in data of a higher layer higher than the physical layer; and
receiving circuitry configured to receive, over a television broadcast network, transmission data in which the index associated with the predetermined process-related information in the relevant table is included in the data of the physical layer,
the processing circuitry configured to acquire the index included in the data of the physical layer from the transmission data, and
the processing circuitry configured to execute the output process corresponding to the predetermined process-related information associated with the index included in the data of the physical layer in the relevant table,
wherein, in the relevant table, a location code indicating a region in which the output process corresponding to the predetermined process-related information is to be performed is associated with the index.

7. The receiving device according to claim 6, wherein, in the transmission data, the location code is included in the data of the physical layer,
the processing circuitry acquires the index and the location code included in the data of the physical layer, and
in a case where the receiving device is located in the region indicated by the location code included in the data of the physical layer, the processing circuitry executes the output process corresponding to the predetermined process-related information associated with the index included in the data of the physical layer in the relevant table.

8. The receiving device according to claim 6, wherein, in a case where the receiving device is located in the region indicated by the location code associated with the index included in the data of the physical layer in the relevant table, the processing circuitry executes the output process corresponding to the predetermined process-related information associated with the index included in the data of the physical layer in the relevant table.

9. The receiving device according to claim 6, wherein
the processing circuitry acquires the relevant table included in the data of the higher layer from the transmission data.

10. The receiving device according to claim 6, wherein the processing circuitry acquires the relevant table from a server.

11. The receiving device according to claim 6, wherein the receiving circuitry receives the transmission data in accordance with frequency division multiplexing (FDM) or time division multiplexing (TDM).

12. A receiving method, comprising:
acquiring a relevant table in which predetermined process-related information is registered, the predetermined process-related information related to an output process of outputting an alert on a receiving side, the predetermined process-related information being associated with an index that is included in data of a physical layer, the relevant table being included in data of a higher layer higher than the physical layer; and
receiving, over a television broadcast network, transmission data in which the index associated with the predetermined process-related information in the relevant table is included in the data of the physical layer;
acquiring the index included in the data of the physical layer from the transmission data; and
executing the output process corresponding to the predetermined process-related information associated with the index included in the data of the physical layer in the relevant table, wherein, in the relevant table, a location code indicating a region in which the output process corresponding to the predetermined process-related information is to be performed is associated with the index.

* * * * *